United States Patent
Lv et al.

(10) Patent No.: US 12,445,411 B2
(45) Date of Patent: Oct. 14, 2025

(54) DNS QUERY METHOD AND DEVICE

(71) Applicant: VIVO MOBILE COMMUNICATION CO., LTD., Guangdong (CN)

(72) Inventors: Huazhang Lv, Dongguan (CN); Xiaobo Wu, Dongguan (CN); Xiaowan Ke, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 91 days.

(21) Appl. No.: 18/417,441

(22) Filed: Jan. 19, 2024

(65) Prior Publication Data

US 2024/0163246 A1 May 16, 2024

Related U.S. Application Data

(63) Continuation of application No. PCT/CN2022/106813, filed on Jul. 20, 2022.

(30) Foreign Application Priority Data

Jul. 20, 2021 (CN) .......................... 202110821650.2

(51) Int. Cl.
*H04L 61/4511* (2022.01)
*H04L 61/4552* (2022.01)

(52) U.S. Cl.
CPC ...... *H04L 61/4511* (2022.05); *H04L 61/4552* (2022.05)

(58) Field of Classification Search
CPC .......................... H04L 61/4511; H04L 61/4552
See application file for complete search history.

(56) References Cited

U.S. PATENT DOCUMENTS

| | | | |
|---|---|---|---|
| 2016/0150004 A1 | 5/2016 | Hentunen | |
| 2019/0306110 A1* | 10/2019 | Davis | H04L 63/068 |
| 2020/0145385 A1* | 5/2020 | Chauhan | H04L 63/0281 |
| 2020/0329008 A1* | 10/2020 | Dao | H04L 61/5007 |
| 2025/0080591 A1* | 3/2025 | Mariyani | H04W 60/06 |
| 2025/0088481 A1* | 3/2025 | Kalligudd | H04L 12/4633 |

FOREIGN PATENT DOCUMENTS

| | | |
|---|---|---|
| CN | 102739811 A | 10/2012 |
| CN | 103957283 A | 7/2014 |
| CN | 105472051 A | 4/2016 |
| CN | 108156277 A | 6/2018 |
| CN | 111416883 A | 7/2020 |
| CN | 112333273 A | 2/2021 |

* cited by examiner

*Primary Examiner* — Minh Chau Nguyen
(74) *Attorney, Agent, or Firm* — The Webb Law Firm

(57) ABSTRACT

A DNS query method includes receiving, by a first communication device, a DNS query to obtain an FQDN; sending, by the first communication device, first information to a second communication device, where the first information includes the FQDN or N server IP addresses corresponding to the FQDN, and N is a positive integer; obtaining, by the first communication device, server experience information corresponding to the N server IP addresses from the second communication device, where the server experience information is used to indicate service experience of a server corresponding to each of the server IP addresses; and sending, by the first communication device, a DNS response to a terminal based on the server experience information.

20 Claims, 14 Drawing Sheets

A DNS QUERY METHOD AND DEVICE

CROSS-REFERENCE TO RELATED APPLICATIONS

This application is a Bypass Continuation Application of International Patent Application No. PCT/CN2022/106813, filed Jul. 20, 2022, and claims priority to Chinese Patent Application No. 202110821650.2, filed Jul. 20, 2021, the disclosures of which are hereby incorporated by reference in their entireties.

BACKGROUND OF THE INVENTION

Field of the Invention

This application pertains to the field of communication technologies, and particularly relates to a domain name server (DNS) query method and apparatus, a device, and a non-transitory readable storage medium.

Description of Related Art

Currently, when a DNS server performs DNS resolution and returns a DNS response, Internet protocol (IP) addresses of a plurality of servers are generally fed back. For example, for a DNS query of www.****.com, the DNS server feeds back the following plurality of IP addresses as the DNS response: 10.1.1.1, 10.1.1.2, and 10.1.1.3.

SUMMARY OF THE INVENTION

According to a first aspect, a DNS query method is provided. The method includes: receiving, by a first communication device, a DNS query to obtain a fully qualified domain name (FQDN); sending, by the first communication device, first information to a second communication device, where the first information includes the FQDN or N server IP addresses corresponding to the FQDN, and N is a positive integer; obtaining, by the first communication device, server experience information corresponding to the N server IP addresses from the second communication device, where the server experience information is used to indicate service experience of a server corresponding to each of the server IP addresses; and sending, by the first communication device, a DNS response to a terminal based on the server experience information.

According to a second aspect, a DNS query apparatus is provided. The apparatus includes: a receiving module, configured to receive a DNS query to obtain a fully qualified domain name FQDN; a sending module, configured to send first information to a second communication device, where the first information includes the FQDN or N server IP addresses corresponding to the FQDN, and N is a positive integer; and an execution module, configured to obtain server experience information corresponding to the N server IP addresses from the second communication device, where the server experience information is used to indicate service experience of a server corresponding to each of the server IP addresses; and the sending module is further configured to send a DNS response to a terminal based on the server experience information.

According to a third aspect, a DNS query method is provided. The method includes: receiving, by a terminal, a DNS response from a first communication device, where the DNS response includes N server IP addresses; and determining, by the terminal, a target server IP address based on the DNS response, where the target server IP address is related to server experience information corresponding to the N server IP addresses; the server experience information is used to indicate service experience of a server corresponding to each of the server IP addresses; the target server IP address is at least one of the N server IP addresses; and N is a positive integer.

According to a fourth aspect, a DNS query apparatus is provided. The apparatus includes: a receiving module, configured to receive a DNS response from a first communication device, where the DNS response includes N server IP addresses; and a determining module, configured to determine a target server IP address based on the DNS response received by the receiving module, where the target server IP address is related to server experience information corresponding to the N server IP addresses; the server experience information is used to indicate service experience of a server corresponding to each of the server IP addresses; the target server IP address is at least one of the N server IP addresses; and N is a positive integer.

According to a fifth aspect, a DNS query method is provided. The method includes: obtaining, by a second communication device, N server IP addresses; performing, by the second communication device, a database query based on the N server IP addresses to obtain server experience information of the N server IP addresses, where N is a positive integer; and sending, by the second communication device, the server experience information to a target device, where the target device includes a terminal or a first communication device, and the server experience information is used to indicate service experience of a server corresponding to each of the server IP addresses.

According to a sixth aspect, a DNS query apparatus is provided. The apparatus includes: an obtaining module, configured to obtain N server IP addresses; a query module, configured to perform a database query based on the N server IP addresses obtained by the obtaining module, to obtain server experience information of the N server IP addresses, where N is a positive integer; and a sending module, configured to send the server experience information obtained by the query module through the query to a target device, where the target device includes a terminal or a first communication device, and the server experience information is used to indicate service experience of a server corresponding to each of the server IP addresses.

According to a seventh aspect, a terminal is provided. The terminal includes a processor, a memory, and a program or an instruction stored in the memory and executable on the processor, and when the program or the instruction is executed by the processor, the steps of the method according to the second aspect are implemented.

According to an eighth aspect, a terminal is provided, including a processor and a communication interface. The communication interface is configured to receive a DNS response from a first communication device, where the DNS response includes N server IP addresses; and the processor is configured to determine a target server IP address based on the DNS response received by the communication interface, where the target server IP address is related to server experience information corresponding to the N server IP addresses; the server experience information is used to indicate service experience of a server corresponding to each of the server IP addresses; the target server IP address is at least one of the N server IP addresses; and N is a positive integer.

According to a ninth aspect, a communication device is provided. The communication device includes a processor, a memory, and a program or an instruction stored in the memory and executable on the processor, and when the program or the instruction is executed by the processor, the steps of the method according to the first aspect or the third aspect are implemented.

According to a tenth aspect, a communication device is provided, including a processor and a communication interface.

The communication interface is configured to receive a DNS query to obtain a fully qualified domain name FQDN; and is further configured to send first information to a second communication device, where the first information includes the FQDN or N server IP addresses corresponding to the FQDN, and N is a positive integer; the processor is configured to obtain server experience information corresponding to the N server IP addresses from the second communication device, where the server experience information is used to indicate service experience of a server corresponding to each of the server IP addresses; and the communication interface is further configured to send a DNS response to a terminal based on the server experience information.

Alternatively, the processor is configured to obtain N server IP addresses; and is further configured to perform a database query based on the N server IP addresses obtained by the processor, to obtain server experience information of the N server IP addresses, where N is a positive integer; and the communication interface is configured to send the server experience information obtained by the processor through the query to a target device, where the target device includes a terminal or a first communication device, and the server experience information is used to indicate service experience of a server corresponding to each of the server IP addresses.

According to an eleventh aspect, a non-transitory readable storage medium is provided. A program or an instruction is stored in the non-transitory readable storage medium, and when the program or the instruction is executed by a processor, the steps of the method according to the first aspect, the steps of the method according to the third aspect, or the steps of the method according to the fifth aspect are implemented.

According to a twelfth aspect, a chip is provided. The chip includes a processor and a communication interface, the communication interface is coupled to the processor, and the processor is configured to run a program or an instruction to implement the method according to the first aspect, the method according to the third aspect, or the method according to the fifth aspect.

According to a thirteenth aspect, a computer program/program product is provided. The computer program/program product is stored in a non-volatile storage medium, and the program/program product is executed by at least one processor to implement the steps of the method according to the first aspect, the steps of the method according to the third aspect, or the steps of the method according to the fifth aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill based on the embodiments of this application shall fall within the protection scope of this application.

In the specification and claims of this application, the terms "first", "second", and the like are intended to distinguish between similar objects but do not describe a specific order or sequence. It should be understood that the terms used in such a way are interchangeable in proper circumstances so that the embodiments of this application can be implemented in orders other than the order illustrated or described herein. Objects classified by "first" and "second" are usually of a same type, and the number of objects is not limited. For example, there may be one or more first objects. In addition, in the specification and claims, "and/or" represents at least one of connected objects, and a character "/" generally represents an "or" relationship between associated objects.

It should be noted that technologies described in the embodiments of this application are not limited to a Long Time Evolution (LTE)/LTE-Advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), single-carrier frequency division multiple access (SC-FDMA), and other systems. The terms "system" and "network" in the embodiments of this application may be used interchangeably. The technologies described can be applied to both the systems and the radio technologies mentioned above as well as to other systems and radio technologies. The following describes a new radio (NR) system for example purposes, and NR terms are used in most of the following descriptions. These technologies can also be applied to applications other than an NR system application, such as a 6th generation (6G) communication system.

Figure 1:
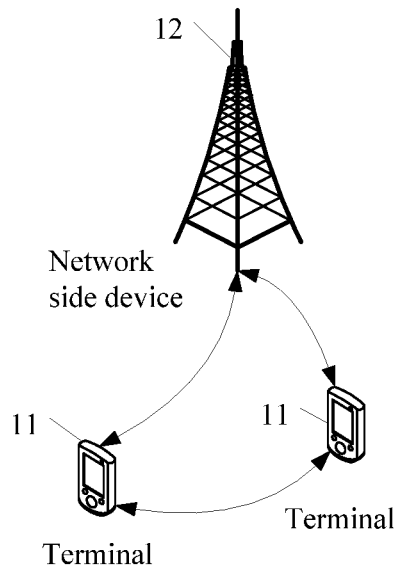
FIG. 1 is a system architecture diagram of a communication system according to an embodiment of this application.

FIG. 1 is a block diagram of a wireless communication system to which the embodiments of this application can be applied. The wireless communication system includes a terminal 11 and a communication device 12.

The terminal 11 may be a terminal side device such as a mobile phone, a tablet personal computer, a laptop computer or a notebook computer, a personal digital assistant (PDA), a palm computer, a netbook, an ultra-mobile personal computer (UMPC), a mobile internet device (MID), an augmented reality (AR)/virtual reality (VR) device, a robot, a wearable device, vehicle user equipment (VUE), pedestrian user equipment (PUE), a smart household (a household device with a wireless communication function, such as a refrigerator, a television, a washing machine, or furniture), and the wearable device may include a smart watch, a smart band, a smart headset, smart glasses, smart jewelry (a smart bangle, a smart bracelet, a smart ring, a smart necklace, a smart anklet, and a smart chain), a smart wrist strap, a smart dress, a game console, and the like. It should be noted that a type of the terminal 11 is not limited in the embodiments of this application.

The communication device may be a network side device, and a network side device 12 may be a base station or a core network element. The base station may be referred to as a NodeB, an evolved NodeB, an access point, a base transceiver station (BTS), a radio base station, a radio transceiver station, a basic service set (BSS), an extended service set (ESS), a NodeB, an evolved NodeB (eNB), a home NodeB, a home evolved NodeB, a WLAN access point, a WiFi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a type of the base station is not limited.

For example, the communication device 12 includes a first communication device, a second communication device, and a third communication device.

In an example, the first communication device may be a DNS server or an application function AF.

In an example, the second communication device may be a network data analytics function network element (NWDAF), and the NWDAF is a new network element proposed in the SA2, and is configured to collect data from a network element and an OAM, and provide analytics information and an analytics result for the network element.

In an example, the third communication device may be an edge application server discovery function (EASDF), which is a 3GPP core network element that is newly proposed in the SA2 and that is configured to process a DNS query request sent by UE, and the EASDF is an LDNSR (a name change of a local DNS resolver)), an SMF, or an AF.

Generally, the EASDF is a network element configured to process a DNS query of UE. In the related art, the UE sends the DNS query to the EASDF. Then, the EASDF determines whether to send the DNS query to a C-DNS central DNS or an L-DNS local DNS according to the DNS query, and then sends information such as an FQDN in the DNS query to an SMF. The SMF provides an IP address of a corresponding DNS server, for example, an IP address of the C-DNS or the L-DNS. Then, the C-DNS or the L-DNS parses the FQDN, finds the IP address corresponding to the FQDN, and sends the IP address to the EASDF. The EASDF stores a query result in the SMF, and then sends the query result to the UE. In this way, the UE obtains the requested server IP address of the FQDN.

The NWDAF network element may collect data from other 5GC network elements such as an AF and an OAM, and provide a specified analytics function. The NWDAF can obtain an IP address of an application server and the FQDN from the AF. In other words, if the UE has established communication or a link with an application server, an IP address or an FQDN of the server is recorded in the NWDAF. In addition, the AF may also provide related data of the application server, for example, location information of the server and performance data of the server (for example, a packet loss rate and a throughput).

Based on this, the embodiments of this application provide a DNS query method and apparatus, a device, and a non-transitory readable storage medium. After obtaining N server IP addresses corresponding to an FQDN, a second communication device may obtain server experience information corresponding to the N server IP addresses through a query, and then send the server experience information corresponding to the N server IP addresses to a first communication device or a terminal. The server experience information is used to indicate service experience of a server corresponding to each server IP address in the foregoing N server IP addresses, so that the first communication device or the terminal can optimize a DNS response based on the optimal or sub-optimal degrees of service experience of the server corresponding to each server IP address, and the terminal can select an optimal IP address to initiate a service connection each time, thereby improving system communication efficiency.

With reference to the accompanying drawings, the following describes in detail a DNS query method provided in the embodiments of this application by using some embodiments and application scenes thereof.

Usually, after receiving the DNS response, a terminal randomly selects one of the IP addresses to access and establish a service connection. A state of a server corresponding to each IP address is unknown, for example, a current load degree, a bandwidth size, a rate, and the like of the server. Consequently, service performance of an accessed service cannot be guaranteed by the terminal in this random selection manner.

Figure 2:
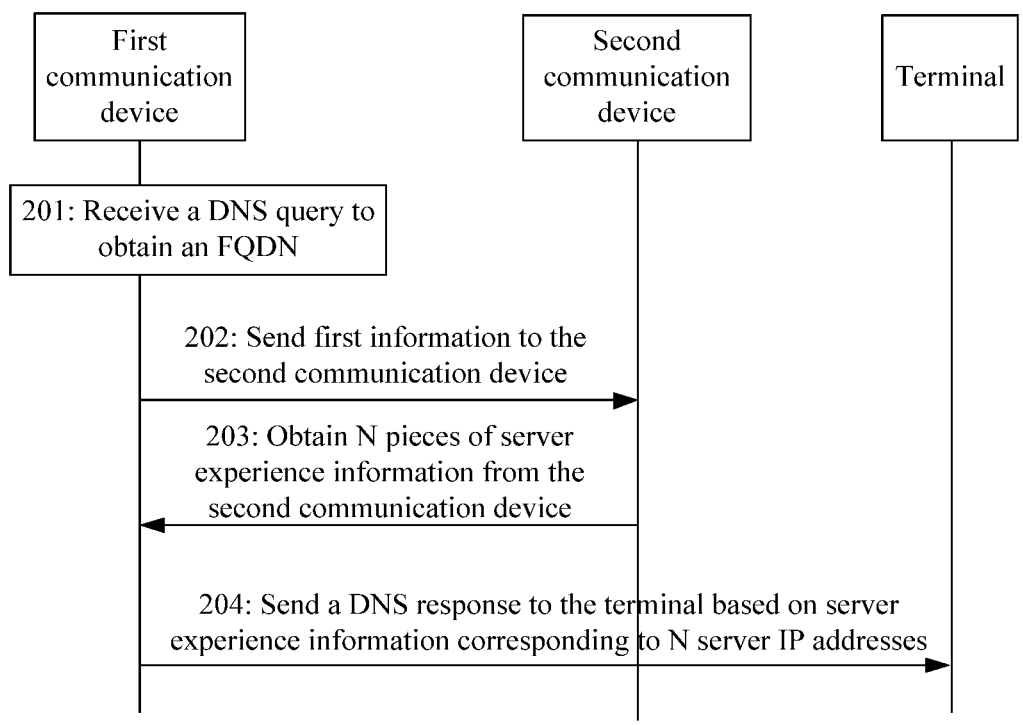
FIG. 2 is a first schematic flowchart of a DNS query method according to an embodiment of this application.

An embodiment of this application provides a DNS query method. As shown in FIG. 2, the method includes the following steps 201 to 204:

Step 201: A first communication device receives a DNS query to obtain an FQDN.

In this embodiment of this application, the first communication device may receive the DNS query from a terminal, and obtain the FQDN in the DNS query.

Step 202: The first communication device sends first information to a second communication device.

In this embodiment of this application, the first information includes the FQDN or N server IP addresses corresponding to the FQDN, and N is a positive integer.

For example, the first communication device sends the first information to the second communication device by using first signaling, to request server experience information. The first signaling may be an NWDAF analytics information request (Nnwdaf_AnalyticsInfo_Request), or an NWDAF analytics subscription (Nnwdaf_AnalyticsSubscription_Subscribe). The first signaling includes the following parameters:

- Analytics ID=Service Experience, which means requesting service experience;
- Target of Analytics Reporting=any UE, which means that an analytics target is for any UE;
- Analytics Filter Information, where the analytics filter information includes at least one of the following: an application ID (used to identify an application), an analytics target period (a time period for requesting analysis), single network slice selection assistance information (S-NSSAI), a data network name (DNN), an application server address(es), an area of interest: that is, only a corresponding result in an area is obtained, UPF info (UPF information, that is, information about a UPF that currently serves the UE, such as a UPF ID or a UPF IP address), data network access (DN Access Identifier ID, DNAI), a UE location, an FQDN (a domain name in a DNS query), or an application server instance IP address (a server IP address obtained after the FQDN is parsed); and
- a UE location or UE location information, such as a cell ID or a tracking area ID (TAI) table.

In this embodiment of this application, the first communication device may subscribe to or request the server experience information by sending the first information to the second communication device. In an example, after the first communication device successfully subscribes to the server experience information, the second communication device feeds back the server experience information to the first communication device periodically or after the subscribed server experience information is updated. In another example, after receiving a new DNS query, the first communication device may directly sort, according to the server experience information, server IP addresses obtained after the FQDN is parsed, without triggering a new request for obtaining server experience information.

Step 203: The first communication device obtains N pieces of server experience information from the second communication device.

In this embodiment of this application, the N pieces of server experience information correspond to the N server IP addresses obtained after the FQDN is parsed, that is, one piece of server experience information corresponds to one of the server IP addresses obtained after the FQDN is parsed. Each piece of server experience information in the foregoing N pieces of server experience information is used to indicate service experience of a server corresponding to a respective corresponding server IP address.

In this embodiment of this application, the N pieces of server experience information are obtained by the second communication device by performing a database query according to the first information.

In this embodiment of this application, the server experience information includes at least one of the following: a response delay, an uplink/downlink transmission rate, an uplink/downlink bandwidth, a packet loss rate, or a maximum rate.

For example, the second communication device feeds back the N pieces of server experience information to the first communication device by using second signaling. The second signaling includes an analytics information response (Nnwdaf_AnalyticsInfo_Request response) or an analytics subscription notification (Nnwdaf_AnalyticsSubscription Notify). The signaling provides the server experience information.

Step 204: The first communication device sends a DNS response to a terminal based on the server experience information corresponding to the N server IP addresses.

Optionally, in this embodiment of this application, the DNS response includes the N server IP addresses.

Optionally, in this embodiment of this application, the DNS response further includes at least one of the following:
- the server experience information corresponding to the N server IP addresses;
- order information corresponding to the N server IP addresses; or
- a target server IP address, where
- the order information corresponding to the N server IP addresses is used to represent the optimal or sub-optimal degrees of service experience of a server corresponding to each of the server IP addresses, and the order information corresponding to the N server IP addresses is determined based on the server experience information; and the target server IP address is determined based on the server experience information, and the target server IP address is at least one of the N server IP addresses. That is, the DNS response may indicate one or more server IP addresses, so that UE makes a selection.

Optionally, in this embodiment of this application, the order information corresponding to the N server IP addresses includes:
- an order list corresponding to the N server IP addresses;
- priority information corresponding to the N server IP addresses; and
- the sorted N server IP addresses.

For example, the first communication device may subscribe to or request server experience information in the second communication device, to determine server IP addresses and a priority sequence of the server IP addresses in the DNS response sent to the terminal.

In an example, the DNS response includes the sorted N server IP addresses.

In an example, in addition to unsorted N server IP addresses (that is, out-of-order N server IP addresses), the DNS response may include at least one of the following: the server experience information corresponding to the N server IP addresses, the target server IP address, the order list corresponding to the N server IP addresses, or the priority information corresponding to the N server IP addresses.

In an example, in the DNS response, a first server IP address may have a highest priority between the first communication device and the terminal by default, or a first server IP address may be a preferred access IP by default, or the first communication device may perform priority marking on a plurality of IP addresses in the DNS response, to distinguish priorities of different IP addresses. It should be noted that the terminal in this embodiment of this application has a priority identification capability, and may select a proper server IP address (for example, select a server IP address with a highest priority or select the first server IP address by default) for access based on the priority information in the DNS response. The terminal in this embodiment of this application can alternatively negotiate with the first communication device (for example, a DNS server), that is, the first server IP address has the highest priority by default in the DNS response.

Optionally, in this embodiment of this application, the first communication device may send the DNS response to the terminal by using a NAS message.

Optionally, in this embodiment of this application, when sending the first information to the second communication device, the first communication device may further send the following information to the second communication device, for example, UPF information, a data network access identifier (DNAI), and a data network name (DNN).

Optionally, in this embodiment of this application, the N server IP addresses corresponding to the FQDN may be obtained in the following two implementations.

Possible Implementation 1:

For example, in a case that the first information includes the N server IP addresses, before the foregoing step 202, the DNS query method provided in this embodiment of this application may include the following steps 202a:

Step 202a: The first communication device performs DNS resolution according to the FQDN to obtain the N server IP addresses that match the FQDN.

For example, the first communication device is a DNS server. After receiving the DNS query and obtaining the FQDN, the DNS server may parse the FQDN to obtain the N server IP addresses corresponding to the FQDN. In addition, the DNS server sends a plurality of server IP addresses to an NWDAF (that is, the second communication device), to obtain server experience information of servers corresponding to these server IP addresses.

Possible Implementation 2:

For example, in a case that the first information includes the FQDN, after the foregoing step 202, the DNS query method provided in this embodiment of this application may include the following steps 202b:

Step 202b: The first communication device obtains the N server IP addresses from the second communication device.

The N server IP addresses are obtained by the second communication device by performing a database query according to the FQDN.

For example, the first communication device is a DNS server. After the DNS server receives the DNS query and obtains the FQDN, the DNS server does not parse the FQDN, but sends the FQDN to the second communication device, so that the second communication device may find, in a database of the second communication device by using the FQDN and location information of the terminal, a server IP address that matches the FQDN and server experience information corresponding to the server IP address. It can be understood that the DNS server may serve as an AF to subscribe to server experience information (that is, service experience information) of a server in the second communication device. For example, when the DNS server receives a DNS query request of an FQDN: www.baidu.com, the DNS server sends the FQDN to an NWDAF (that is, the second communication device), and the NWDAF provides a server IP address for the DNS server as a result of domain name resolution. In other words, the NWDAF provides the DNS server with a query response of the DNS query, that is, a server IP address, and then the NWDAF provides the DNS server with experience information corresponding to the server IP address.

Optionally, in this embodiment of this application, the foregoing step 204 may include the following step 204a:

Step 204a: The first communication device sorts the N server IP addresses based on the N pieces of server experience information, and sends the DNS response to the terminal.

The DNS response includes order information corresponding to the N server IP addresses.

For example, the DNS response includes IP addresses of a server 1 and a server 2. An end-to-end delay of the server 1 is 10 ms, and an end-to-end delay of the server 2 is 20 ms. Therefore, it may be considered that server experience of the server 1 is better than that of the server 2, and the server 1 has a higher priority or is ranked first by default.

In the DNS query method provided in this embodiment of this application, after receiving a DNS query, a first communication device obtains an FQDN, and then sends first information (that is, the FQDN or N server addresses corresponding to the FQDN) to a second communication device, so that the second communication device performs a query based on the first information to obtain server experience information corresponding to the N server addresses, and then sends the server experience information corresponding to the N server IP addresses to the first communication device. The server experience information is used to indicate service experience of a server corresponding to each server IP address in the foregoing N server IP addresses, so that the first communication device can optimize a DNS response based on the optimal or sub-optimal degrees of service experience of the server corresponding to each server IP address, and a terminal can select an optimal IP address to initiate a service connection each time, thereby improving system communication efficiency.

Figure 3:
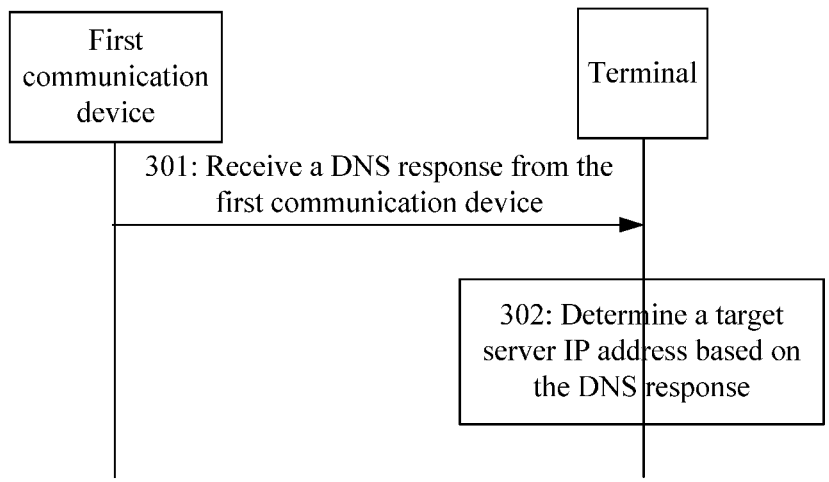
FIG. 3 is a second schematic flowchart of a DNS query method according to an embodiment of this application.

An embodiment of this application provides a DNS query method. As shown in FIG. 3, the method includes the following step 301 and step 302:

Step 301: A terminal receives a DNS response from a first communication device.

In this embodiment of this application, the DNS response includes N server IP addresses.

Step 302: The terminal determines a target server IP address based on the DNS response.

In this embodiment of this application, the target server IP address is related to server experience information corresponding to the N server IP addresses; the server experience information is used to indicate service experience of a server corresponding to each of the server IP addresses; the target server IP address is at least one of the N server IP addresses; and N is a positive integer.

Optionally, in this embodiment of this application, after the terminal determines the target server IP address based on the DNS response, the terminal may further establish a service connection based on the target server IP address. For example, in a case that the target server IP address includes a plurality of server IP addresses, the terminal may randomly select one server IP address to establish a service connection, or may select one server IP address based on ordering or priorities of the plurality of server IP addresses to establish a service connection. It can be understood that the DNS response may further include order information of some server IP addresses in the N server IP addresses.

Optionally, in this embodiment of this application, the N server IP addresses included in the DNS response are the sorted N server IP addresses, and the sorted N server IP addresses are obtained after ordering is performed based on the N pieces of server experience information.

Optionally, in this embodiment of this application, the N server IP addresses included in the DNS response are out-of-order N server IP addresses.

In a First Possible Example

After obtaining the N server IP addresses, the terminal may request the server experience information corresponding to the N server IP addresses from a second communication device based on the N server IP addresses, and then determine the target server IP address based on the server experience information.

Figure 4:
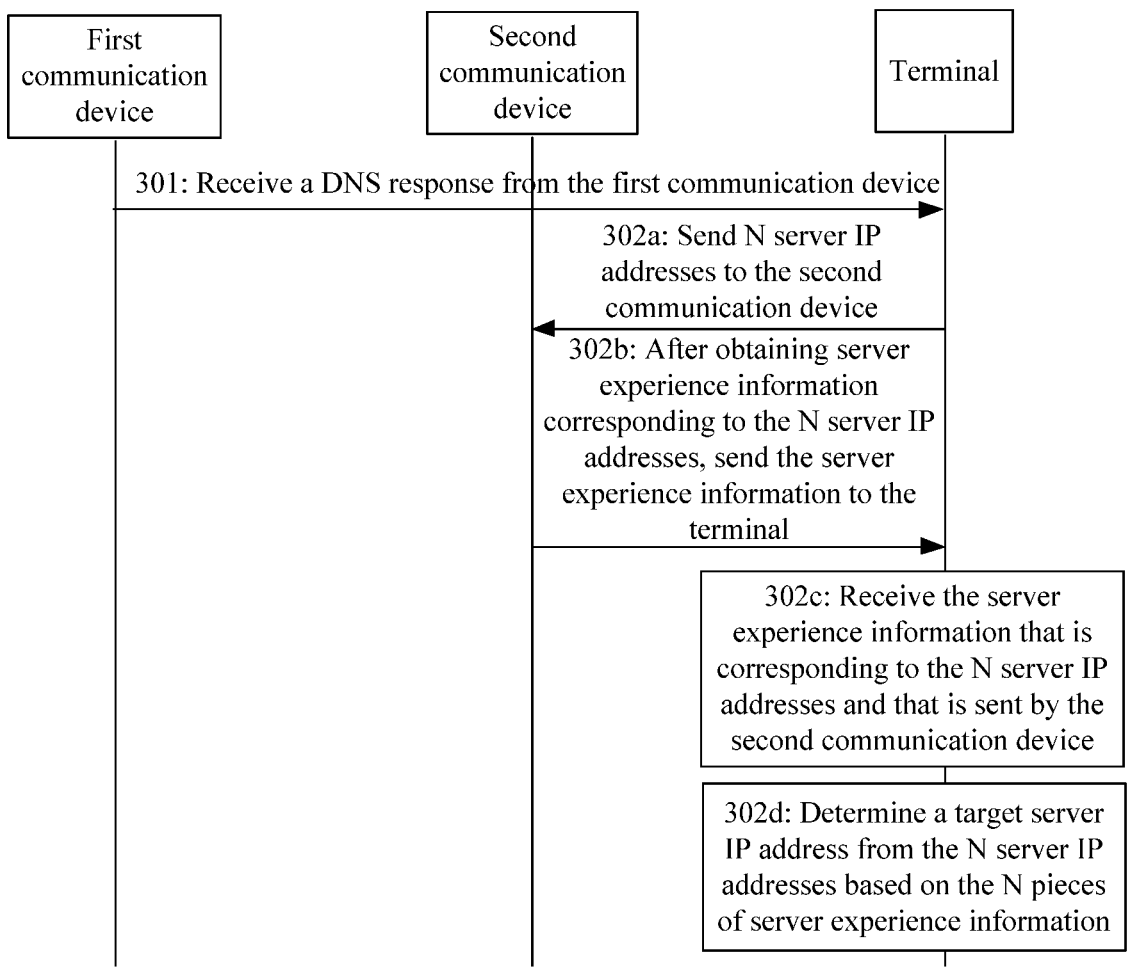
FIG. 4 is a third schematic flowchart of a DNS query method according to an embodiment of this application.

For example, as shown in FIG. 4, the foregoing step 302 may include the following steps 302a, 302c, and 302d:

Step 302a: The terminal sends N server IP addresses to a second communication device. For example, the terminal triggers an NWDAF subscription or request (for example, Nnwdaf AnalyticsInfo Request or Nnwdaf AnalyticsSubscription Subscribe). The request includes a UE IP address, a UE ID (an SUPI, a GPSI, a PEI permanent device identifier, or the like), UE location information, and the like.

Step 302b: After obtaining server experience information corresponding to the N server IP addresses, the second communication device sends the server experience information to the terminal.

For example, after receiving the N server IP addresses, the second communication device may perform a database query to obtain the server experience information corresponding to the N server IP addresses.

Step 302c: The terminal receives the server experience information that is corresponding to the N server IP addresses and that is sent by the second communication device.

Step 302d: The terminal determines the target server IP address from the N server IP addresses based on the N pieces of server experience information.

In an example, the terminal may sort the N server IP addresses based on the N pieces of server experience information, and then determine the target server IP address from the N server IP addresses according to order information of the N server IP addresses.

In a Second Possible Example

In addition to the N server IP addresses, the DNS response may include at least one of the following: the N pieces of server experience information, order information corresponding to the N server IP addresses, or the target server IP address. In this way, the terminal may determine the target server IP address based on the information.

For example, the terminal may subscribe to server experience information in the second communication device, to determine, by using the server experience information corresponding to each server IP address, which IP address in the DNS response should be preferentially accessed.

For example, in a case that the DNS response includes the N pieces of server experience information, the terminal may sort the N server IP addresses, and then determine the target server IP address from the N server IP addresses based the order information of the N server IP addresses.

For example, the foregoing step 302a may further include the following step 302a1:

Step 302a1: The terminal sends the N server IP addresses to the second communication device through a third communication device.

In a Third Possible Example

Figure 5:
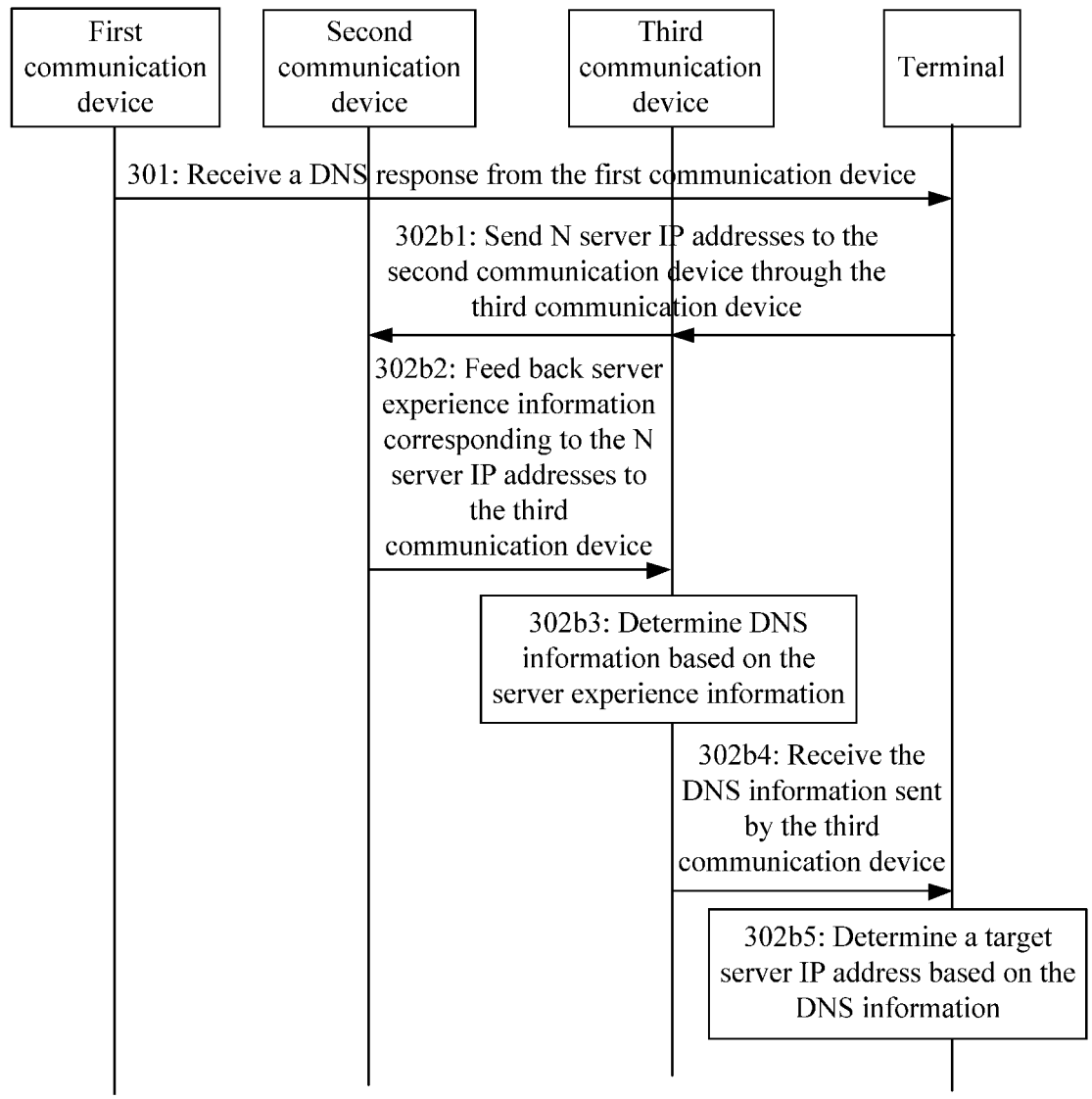
FIG. 5 is a fourth schematic flowchart of a DNS query method according to an embodiment of this application.

For example, as shown in FIG. 5, the foregoing step 302 may include the following steps 302b1, 302b4, and 302b5:

Step 302b1: The terminal sends the N server IP addresses to the second communication device through a third communication device.

Step 302b2: The second communication device feeds back the server experience information corresponding to the N server IP addresses to the third communication device.

For example, the terminal first sends the N server IP addresses, a UE IP addresses, a UE ID (for example, an SUPI, a GPSI, and a PEI permanent device identifier), UE location information, and the like to the third communication device. After obtaining information about the terminal, the third communication device triggers an NWDAF experience information request: Nnwdaf AnalyticsInfo Request or a Nnwdaf AnalyticsSubscription Subscribe. The request includes the following parameters:

Analytics ID=Service Experience, which means requesting service experience;

Target of Analytics Reporting=any UE, which means that an analytics target is for any UE;

Analytics Filter information=(Application ID, Analytics target period, S-NSSAI, DNN, Application Server Address(es), Area of Interest, UPF info, DNAI, UE location, FQDN, or Application server instance IP address); and UE IP address, UE ID (for example, a subscription permanent identifier (SUPI), a generic public subscription identifier (GPSI), a permanent equipment Identifier (PEI)), UE location information, and the like.

Step 302b3: The third communication device determines DNS information based on the server experience information.

Step 302b4: The terminal receives the DNS information sent by the third communication device.

Step 302b5: The terminal determines the target server IP address based on the DNS information.

The DNS information is determined by the third communication device based on the server experience information that is corresponding to the N server IP addresses and that is fed back by the second communication device.

For example, the third communication device is an SMF, an EASDF, or an AF. The SMF, the EASDF, or the AF may request service experience of each IP address according to the IP address in the DNS response. Then, a server IP address with best service experience may be sent to the terminal, to notify the terminal that the IP is optimal in the DNS response.

Optionally, the DNS information includes at least one of the following:

an order list corresponding to the N server IP addresses;
priority information corresponding to the N server IP addresses; or
the sorted N server IP addresses.

In one example, the DNS response includes unsorted N server IP addresses (that is, out-of-order N server IP addresses). Correspondingly, the DNS information includes the sorted N server IP addresses.

In an example, the DNS information may include at least one of the following: the server experience information corresponding to the N server IP addresses, the target server IP address, an order list corresponding to the N server IP addresses, or priority information corresponding to the N server IP addresses.

In an example, in the DNS information, the third communication device may consider that a first server IP address has a highest priority by default, or use a first server IP address as a preferred access IP by default, or the first communication device may perform priority marking on a plurality of IP addresses in the DNS information. It should be noted that the terminal in this embodiment of this application has a priority identification capability, and may select a proper server IP address (for example, select a server IP address with a highest priority or select the first server IP address by default) for access based on the priority information in the DNS information.

It should be noted that the third communication device may directly send the server experience information to the terminal without performing ordering, and the terminal performs analysis or ordering.

For example, after learning the order list of the N server IP addresses or the sorted N server IP addresses, the terminal may select a server IP address that is ranked first as an optimal server IP address (that is, the target server IP address) by default, to ensure that an address for initiating a service connection each time is an optimal address. Alternatively, the UE may attempt the server IP addresses one by one in an order, provided that the connection is successfully established. If the connection cannot be established or fails to be established, the UE attempts a next IP address. For example, a DNS response of an address www.baidu.com includes three IP addresses. The three IP addresses are successively ranked as 10.1.1.1, 10.1.1.2, and 10.1.1.3. Then, the terminal first attempts 10.1.1.1 by default, and attempts 10.1.1.2 if the service connection fails to be established.

For example, after the terminal learns the priority information of the N server IP addresses, the terminal may successively perform access and service connection establishment in descending order of priorities of these server IP addresses.

In the DNS query method provided in this embodiment of this application, after receiving a DNS response, a terminal may determine, based on the DNS response, a target server IP address from N server IP addresses included in the DNS response. The target server IP address is related to server experience information corresponding to the N server addresses, and the N pieces of server experience information are used to indicate service experience of a server corresponding to each server IP address in the foregoing N server IP addresses, so that the terminal can optimize a DNS response based on the optimal or sub-optimal degrees of service experience of the server corresponding to each server IP address, and the terminal can select an optimal IP address to initiate a service connection each time, thereby improving system communication efficiency.

Figure 6:
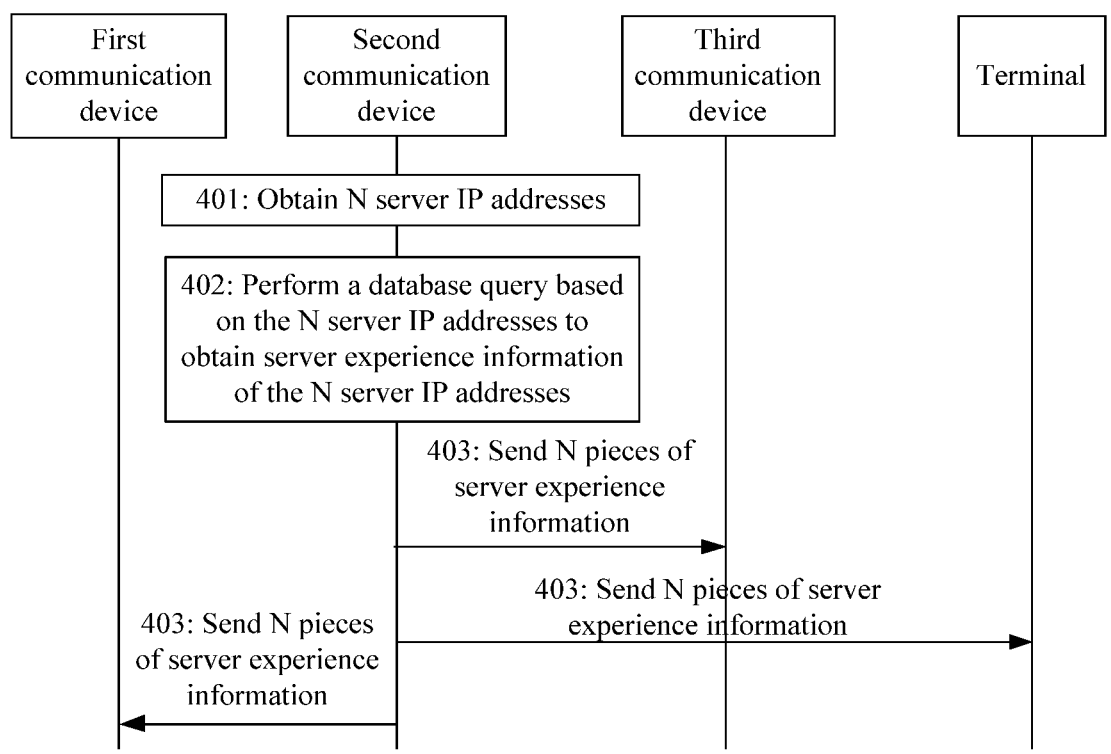
FIG. 6 is a fifth schematic flowchart of a DNS query method according to an embodiment of this application.

An embodiment of this application provides a DNS query method. As shown in FIG. 6, the method includes the following steps 401 to 403:

Step 401: A second communication device obtains N server IP addresses.

Step 402: The second communication device performs a database query based on the N server IP addresses to obtain server experience information of the N server IP addresses.

Step 403: The second communication device sends N pieces of server experience information to a target device.

The target device includes a terminal, a first communication device, or a third communication device, and the server experience information is used to indicate service experience of a server corresponding to each of the server IP addresses.

Optionally, in this embodiment of this application, a process in which the second communication device obtains the N server IP addresses may be implemented in at least two manners.

Figure 7:
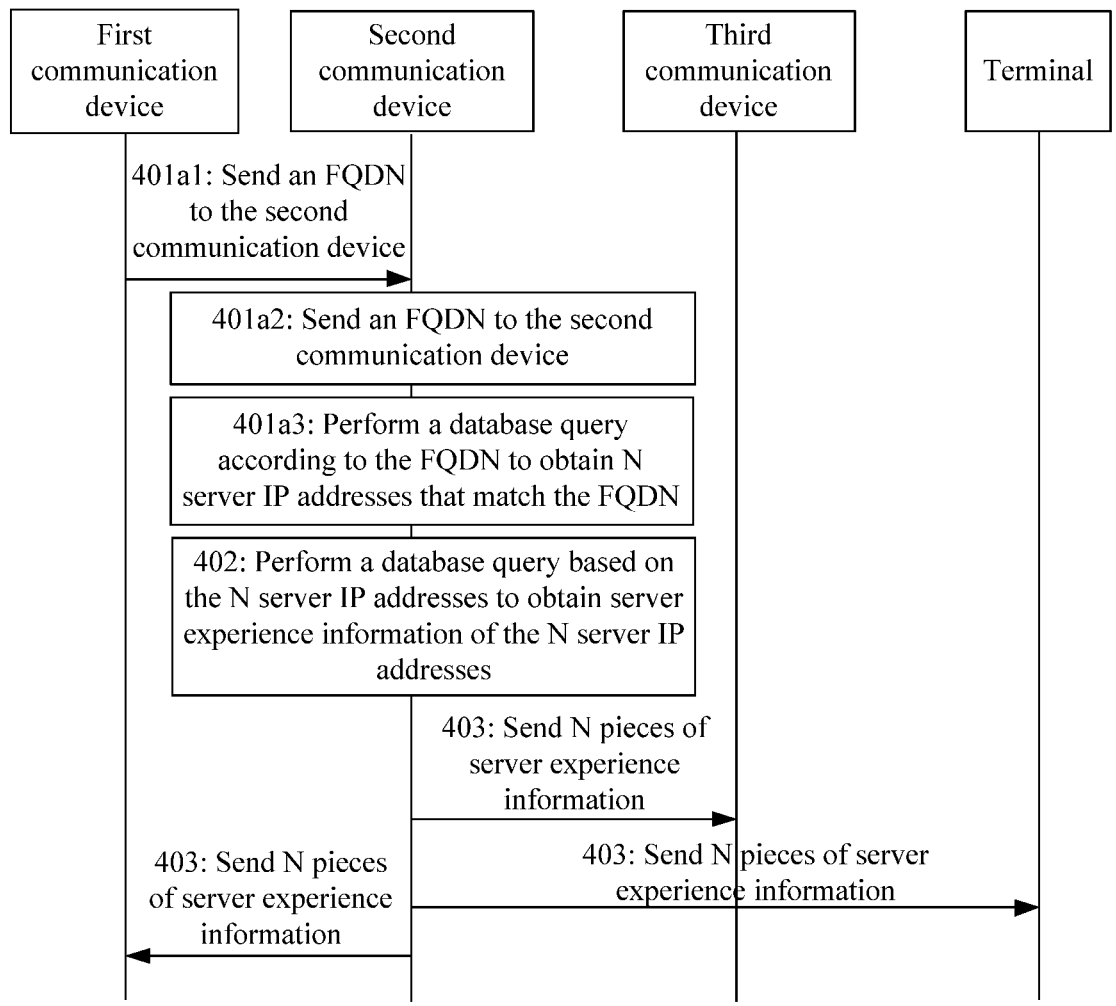
FIG. 7 is a sixth schematic flowchart of a DNS query method according to an embodiment of this application.

Possible Implementation 1:

For example, as shown in FIG. 7, in a case that the target device is the first communication device, the foregoing step 401 may include the following step 401a1 to step 401a3:

Step 401a1: The first communication device sends an FQDN to the second communication device.

Step 401a2: The second communication device receives the FQDN from the first communication device.

Step 401a3: The second communication device performs a database query according to the FQDN to obtain the N server IP addresses that match the FQDN.

In an example, after the foregoing step 401a3, the DNS query method provided in this embodiment of this application may include the following step: The second communication device sends the N server IP addresses to the first communication device.

Figure 8:
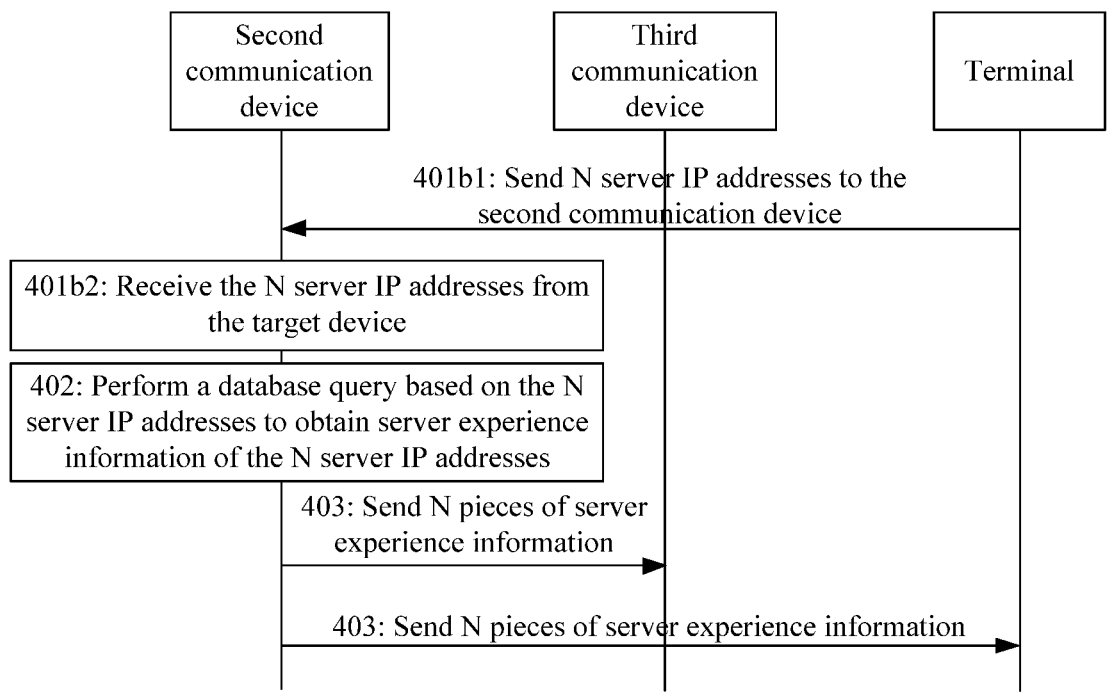
FIG. 8 is a seventh schematic flowchart of a DNS query method according to an embodiment of this application.

Possible Implementation 2:

For example, as shown in FIG. 8 (for example, the target device is the terminal in the figure), the foregoing step 401 may include the following steps 401b:

Step 401b1: The target device sends the N server IP addresses to the second communication device.

Step 401b2: The second communication device receives the N server IP addresses from the target device.

In the DNS query method provided in this embodiment of this application, after obtaining N server IP addresses corresponding to an FQDN, a second communication device may obtain server experience information corresponding to the N server IP addresses through a query, and then send the server experience information corresponding to the N server IP addresses to a first communication device or a terminal. The server experience information is used to indicate service experience of a server corresponding to each server IP address in the foregoing N server IP addresses, so that the first communication device or the terminal can optimize a DNS response based on the optimal or sub-optimal degrees of service experience of the server corresponding to each server IP address, and the terminal can select an optimal IP address to initiate a service connection each time, thereby improving system communication efficiency.

The following describes the technical solutions provided in the embodiments of this application by using several embodiments. For example, for example, the first communication device is a DNS server, and the second communication device is an NWDAF.

Figure 9:
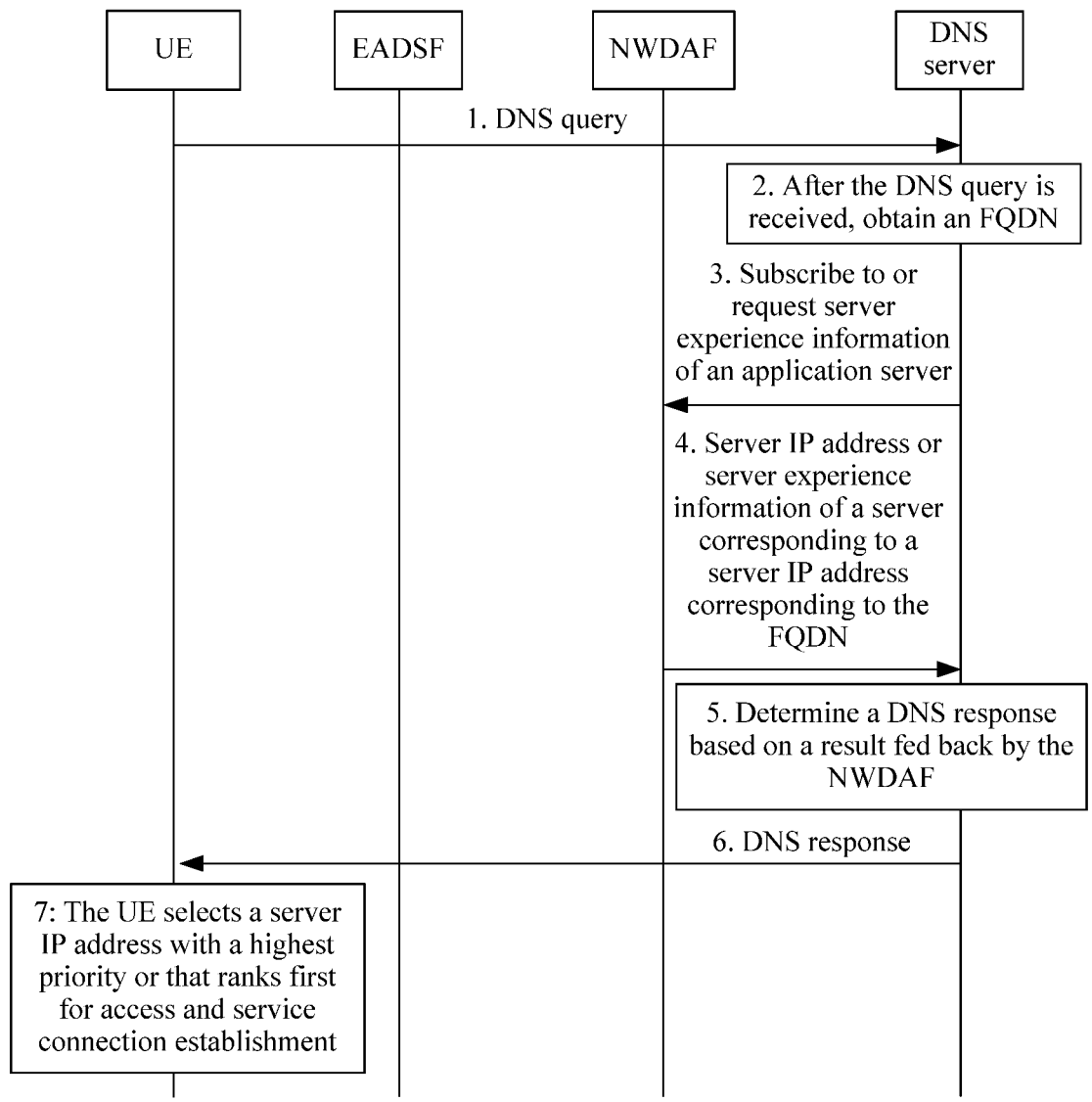
FIG. 9 is an eighth schematic flowchart of a DNS query method according to an embodiment of this application.

Embodiment 1: A DNS Server Requests a Server
IP Address and Server Experience Information As shown in FIG. 9:

Step 1: UE sends a DNS query to a DNS server.

Step 2: After receiving the DNS query, the DNS server may obtain an FQDN.

Step 3: The DNS server subscribes to or requests server experience information of an application server based on the FQDN.

For example, the DNS server may subscribe to the server experience information of the application server from the NWDAF. That is, subscription is used as an example. In step 1 to step 4, after server IP address experience information is provided in the subscription manner, the experience information is continuously updated when each time the experience information is updated or a period of time elapses, and is sent to the DNS server.

For example, the DNS server may subscribe to the server experience information of the application server from the NWDAF by using first signaling. The first signaling includes an NWDAF analytics information request (Nnwdaf AnalyticsInfo Request) or (Nnwdaf AnalyticsSubscription Subscribe). This signaling includes the following parameters:

Analytics ID=Service Experience, which means requesting service experience;

Target of Analytics Reporting=any UE, which means that an analytics target is for any UE;

Analytics Filter information=(Application ID, Analytics target period, S-NSSAI, DNN, Application Server Address(es), Area of Interest, UPF info, DNAI, UE location, FQDN, or Application server instance IP address); and UE IP address, UE ID, UE location information, and the like.

In this way, the DNS server can subscribe to a server IP address or service experience information corresponding to an FQDN from the NWDAF in an area.

Step 4: The NWDAF provides a server IP address or server experience information of a server corresponding to a server IP address corresponding to the FQDN for the DNS server.

For example, the NWDAF can find the corresponding server IP address and the server experience information of the server corresponding to the server IP address according to the FQDN and region information.

For example, the NWDAF may provide the server experience information for the DNS server by using second signaling. The second signaling includes Nnwdaf_AnalyticsInfo_Request response or Nnwdaf_AnalyticsSubscription_Notify.

For example, the server experience information includes at least one of the following:

Service Experience Type: Type of Service Experience analytics, e.g. on voice, video, other (herein refers to a service experience type, for example, a type of service experience analytics, for example, a voice service or a video service);

Service Experience: Service Experience over the Analytics target period (average, variance), for example, a bandwidth, an uplink/downlink rate, a packet loss rates, and the like (service experience is identified herein, for example, a mean or a variance of service experience in a time period, where the service experience includes a plurality of communication indicators such as a bandwidth, an uplink/downlink rate, a packet loss rate, a response delay, and an end-to-end delay); or Application Server Instance Address: Identifies the Application Server Instance (IP address of the Application Server) or FQDN of Application Server, which is the address of the application server herein.

Step 5: The DNS server may perform three operations according to a result fed back by the NWDAF:

1: Use the server IP address fed back by the NWDAF as a DNS response.

2: The DNS server resolves the FQDN in the DNS query, and uses a resolved IP address as a DNS response.

3: The DNS server resolves the FQDN in the DNS query, and uses the FQDN and the server IP address fed back by the NWDAF as a DNS response. In addition, the DNS server may further sort these server IP addresses. An ordering principle is to refer to the server experience information fed back by the NWDAF.

It should be noted that the DNS server may place an optimal server IP address in the first place of an IP address list in the DNS response, or mark priorities of these server IP addresses, or sort these server IP addresses according to service experience of respective corresponding servers.

Step 6: The DNS server sends the DNS response to the UE.

Step 7: The UE selects a server IP address with a highest priority or that ranks first for access and service connection establishment. That is, an IP address with best service experience is selected to initiate a connection. In this way, the UE has a capability of identifying an IP address corresponding to optimal server experience information.

Figure 10:
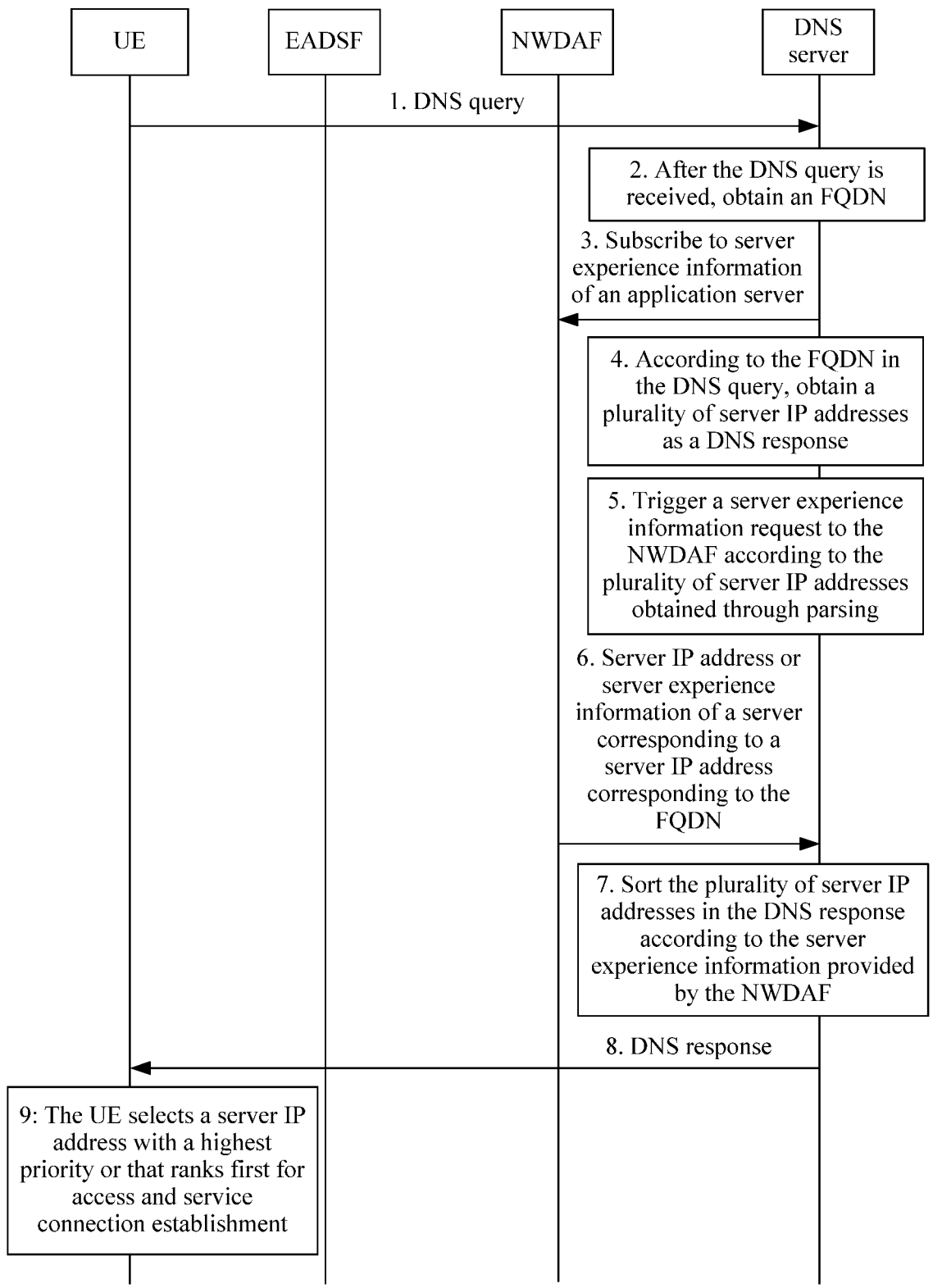
FIG. 10 is a ninth schematic flowchart of a DNS query method according to an embodiment of this application.

Embodiment 2: A DNS Server Sorts Server IP Addresses According to Server Experience Information As shown in FIG. 10:

Step 1 to step 3: Refer to Embodiment 1.

Step 4: According to the FQDN in the DNS query, the DNS server obtains a plurality of server IP addresses as a DNS response.

Step 5: The DNS server may trigger a server experience information request to an NWDAF according to the plurality of server IP addresses obtained through parsing.

For example, for a process of triggering the server experience information request to the NWDAF, refer to step 4 in this embodiment. Details are not described herein again.

Step 6: The NWDAF provides a server IP address or server experience information of a server corresponding to a server IP address corresponding to the FQDN for the DNS server.

For example, for a process of step 6, refer to step 4 in Embodiment 1. Details are not described herein again.

Step 7: The DNS server sorts the plurality of server IP addresses in the DNS response according to the server experience information provided by the NWDAF.

Generally, a server IP address that ranks first may have optimal server experience by default. That is, an IP address with best service experience is selected to indicate a connection.

In addition, the DNS server may mark a priority for each server IP address according to the server experience information.

Steps 8 and 9 are the same as steps 6 and 7 in Embodiment 1.

Embodiment 3: UE Directly Performs Subscription

Figure 11:
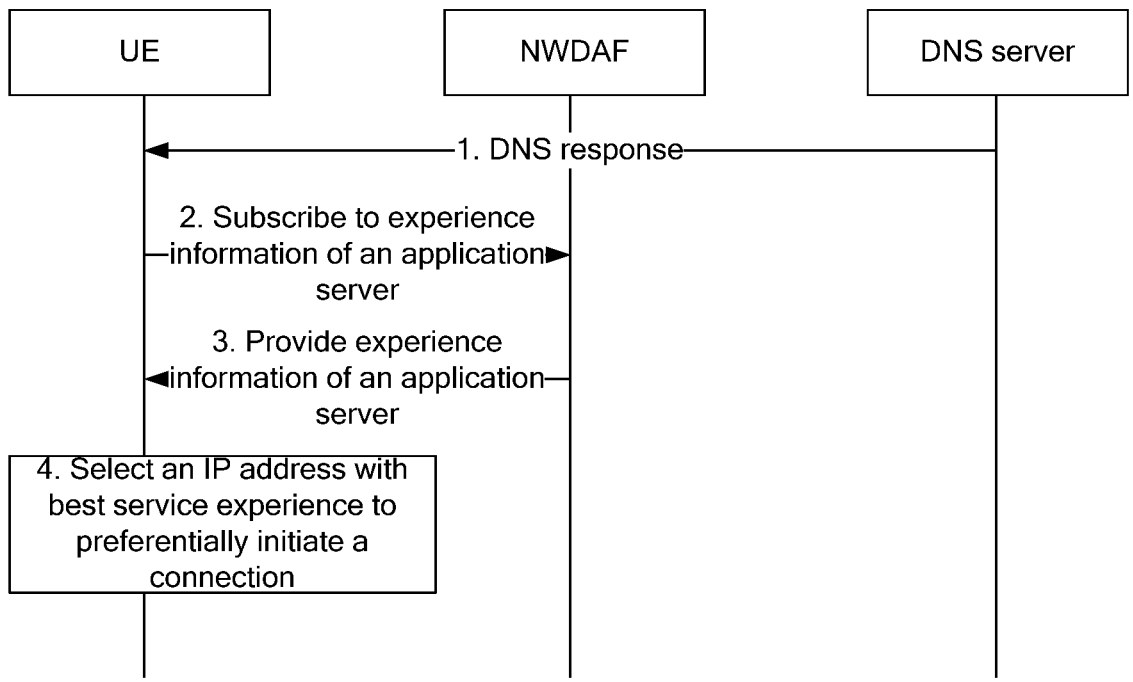
FIG. 11 is a tenth schematic flowchart of a DNS query method according to an embodiment of this application.

As shown in FIG. 11:

Step 1: A DNS server sends a DNS response to UE.

Step 2: The UE may trigger a server experience information request to an NWDAF according to a plurality of server IP addresses in the DNS response, for example, subscription of application server experience information shown in FIG. 11.

For example, the UE may subscribe to application server experience information of an application server to the NWDAF.

For example, the UE may subscribe to the server experience information of the application server from the NWDAF by using first signaling. The first signaling includes Nnwdaf AnalyticsInfo_Request or Nnwdaf_AnalyticsSubscription_Subscribe.

For example, the UE subscribes to the server experience information of the application server to the NWDAF, and may send at least one of the following parameters to the NWDAF:

Analytics ID=Service Experience;
Target of Analytics Reporting=any UE;
Analytics Filter information=(Application ID, Analytics target period, S-NSSAI, DNN, Area of Interest, DNAI, Spatial validity, FQDN, or Application Server Instance Address); or
UE IP address, UE ID, UE location information, and the like.

The UE subscribes to service experience information corresponding to an FQDN from the NWDAF in an area.

The UE may indirectly request or subscribe to the server experience information from the NWDAF by using a 5GC network element such as an SMF/AMF.

Step 3: The NWDAF provides a server IP address or server experience information corresponding to the FQDN for the UE, for example, application server experience information shown in FIG. 11.

For example, for a process of step 6, refer to step 5 in Embodiment 1. Details are not described herein again.

For example, the NWDAF may indirectly provide the server experience information of the server corresponding to the server IP address for the UE by using a 5GC network element such as an SMF/AMF.

Step 4: The same as step 7 (description of the UE capability) in Embodiment 1, that is, select an IP address with best service experience to preferentially initiate a connection.

Embodiment 4: UE Indirectly Performs Subscription by Using an AF

Figure 12:
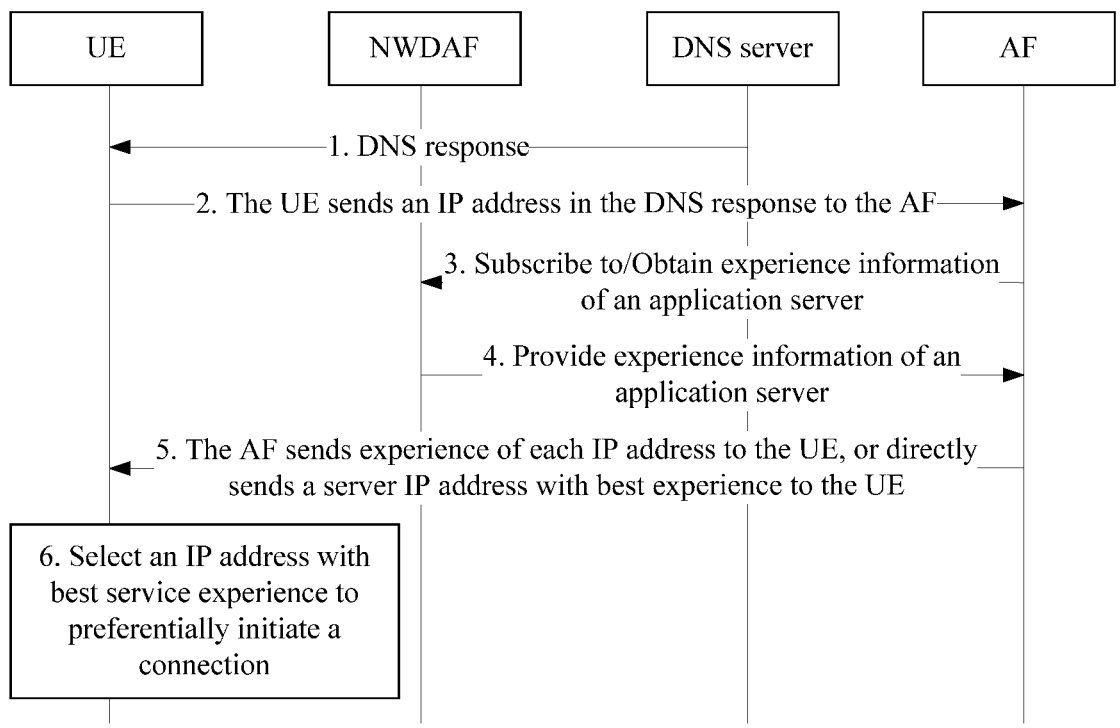
FIG. 12 is an eleventh schematic flowchart of a DNS query method according to an embodiment of this application.

As shown in FIG. 12:

Step 1: UE receives a DNS response, where the response includes a plurality of server IP addresses.

Step 2: The UE establishes a connection to an AF, and sends the plurality of server IP addresses in the DNS response to the AF.

Step 3: The AF triggers subscription or obtaining of application server experience information of an NWDAF, for example, subscription or obtaining of application server experience information shown in FIG. 12.

For example, for a process of step 3, refer to step 3 in Embodiment 1. Details are not described herein again.

Step 4: The NWDAF provides service experience information corresponding to each server IP address, for example, application server experience information shown in FIG. 13.

Step 5: Then, the AF sends the service experience information corresponding to each server IP address to the UE, or the AF sends a server IP address with best experience information to the UE.

Step 6: The UE selects the server address with best service experience for connection establishment or access.

Embodiment 5: An SMF Requests Experience Information

Figure 13:
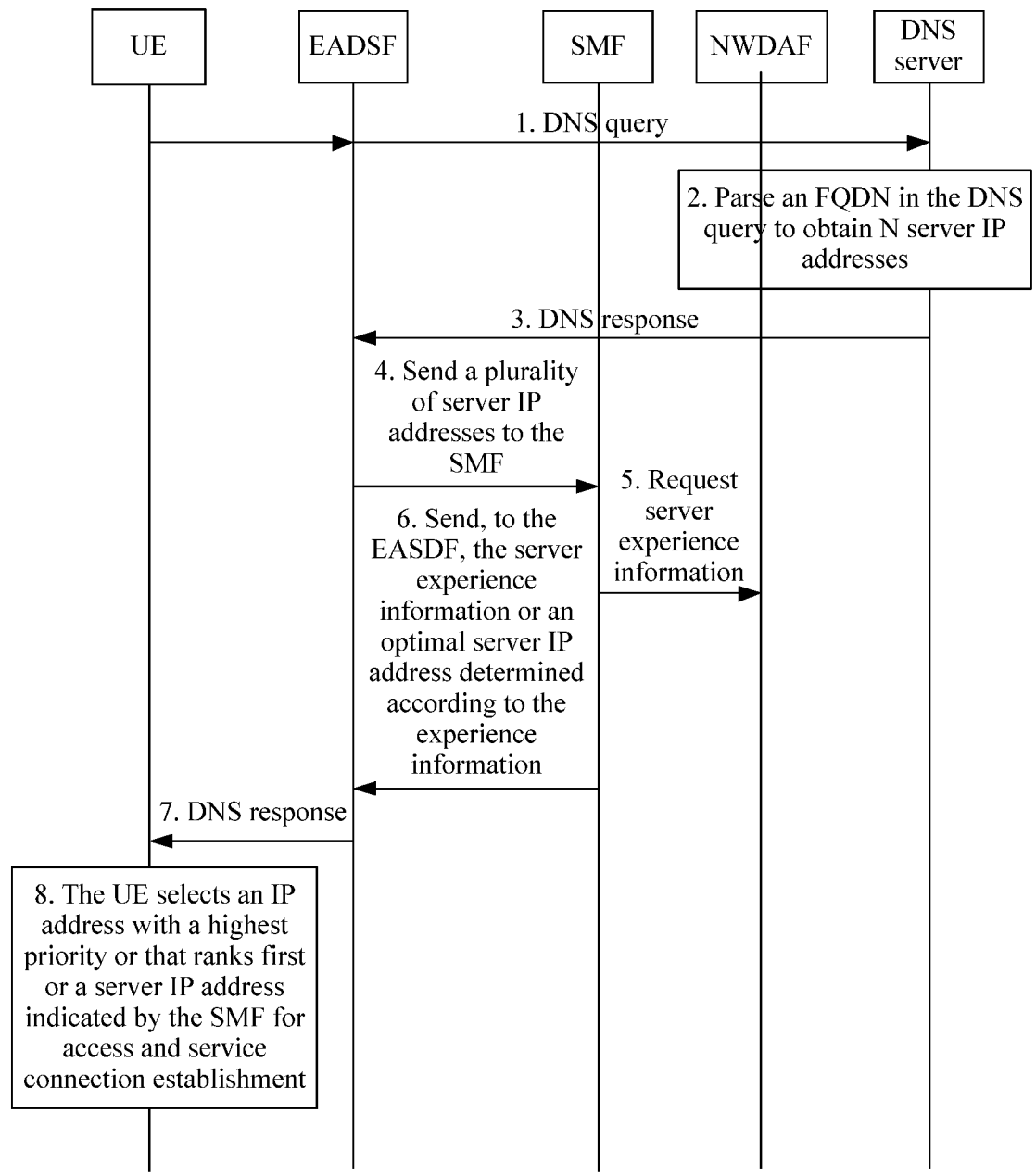
FIG. 13 is a twelfth schematic flowchart of a DNS query method according to an embodiment of this application.

As shown in FIG. 13:
Step 1: UE sends a DNS query.

The DNS query is forwarded to a DNS server through an EASDF.

Step 2: The DNS server parses an FQDN in the DNS query to obtain N server IP addresses, and then sends the N server IP addresses to the UE through the EASDF.

Step 3: The DNS server sends a DNS response to the EASDF, where the DNS response includes the N server IP addresses.

Step 4: The EASDF may send a plurality of server IP addresses to an SMF.

Step 5: The SMF requests server experience information (a process is the same as steps 5 and 6 in Embodiment 2, but the DNS server is changed to the SMF for this request). Then, the NWDAF provides server experience information corresponding to each server IP address for the SMF, so that the SMF can determine an optimal server IP address in these server IP addresses based on the server experience information.

Step 6: The SMF sends the server experience information to the EASDF, or sends, to the EASDF, the optimal server IP address determined according to the experience information.

For example, the EASDF sends the optimal server IP address or a plurality of sorted IP addresses to the UE. The EASDF may sort the plurality of IP addresses, or may obtain the optimal IP address according to the experience information.

Step 7: The EASDF sends the DNS response to the UE, where the DNS response includes order information of the plurality of IP addresses or the plurality of sorted IP addresses.

For example, the UE has a capability of identifying an IP address corresponding to optimal server experience information, and the UE receives the DNS response to obtain the plurality of server IP addresses.

Step 8: The UE selects an IP address with a highest priority or that ranks first or a server IP address indicated by the SMF for access and service connection establishment.

Embodiment 6: An NAS Message Provides an Optimal Server Address

Figure 14:
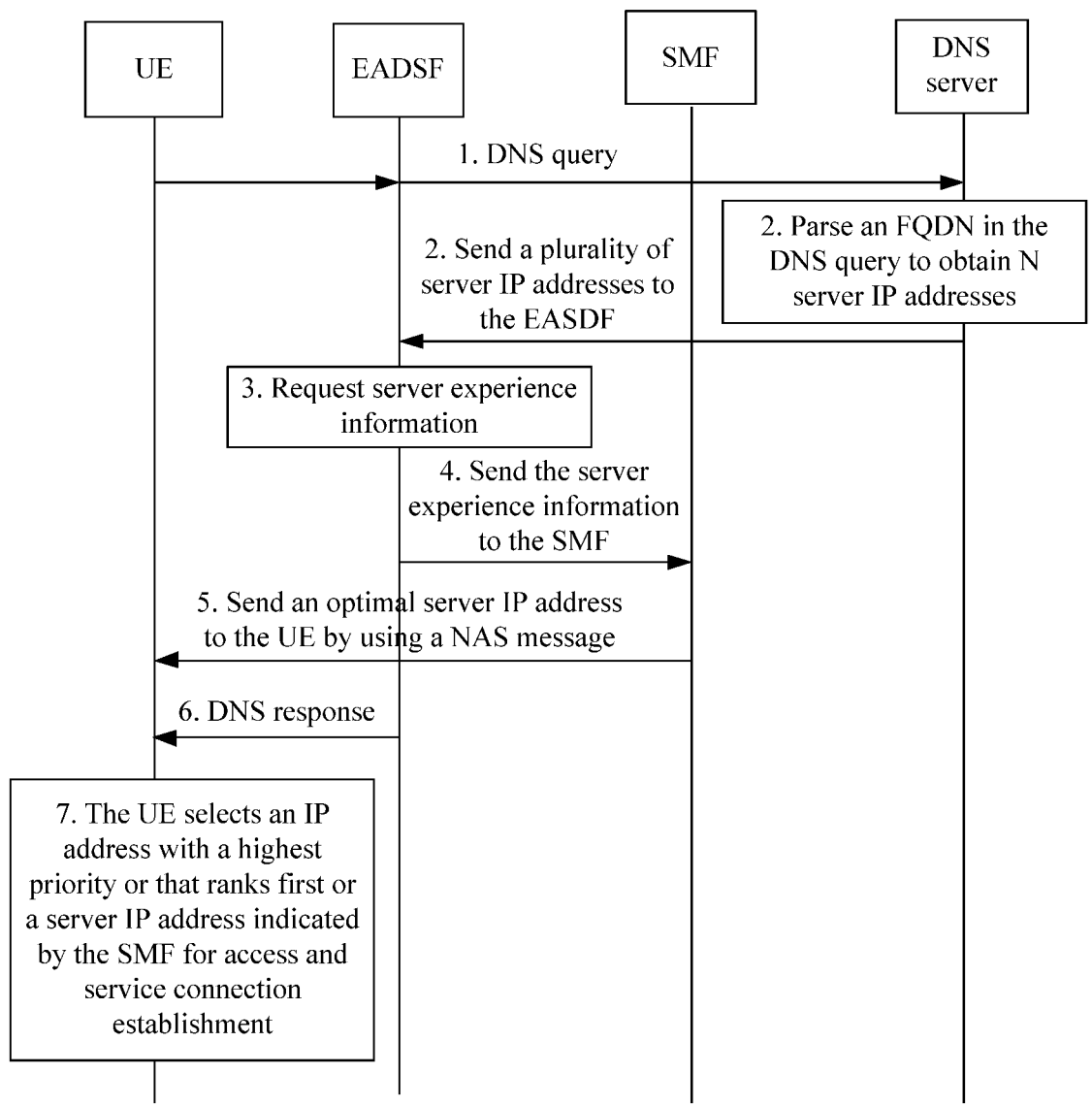
FIG. 14 is a thirteenth schematic flowchart of a DNS query method according to an embodiment of this application.

As shown in FIG. 14:

Step 1: UE sends a DNS query, where the DNS query is forwarded to a DNS server through an EASDF.

Step 2: The DNS server parses an FQDN in the DNS query to obtain N server IP addresses, and then sends the N server IP addresses to the UE through the EASDF.

Step 3: The EASDF requests server experience information according to a plurality of IP addresses in a DNS response, and requested signaling is the EASDF to an NWDAF, as shown in step 3 in Embodiment 1. Then, the NWDAF provides the server experience information.

Step 4: The EASDF sends the server experience information to an SMF.

Step 5: The SMF sends an optimal server IP address to the UE by using a NAS message, or sends order information of the N server IP addresses to the UE.

For example, the process of sending the optimal server IP address may be a NAS process, and is sent to the UE by using an ePCO IE.

Step 6: The EASDF sends the DNS response to the UE. Throughout the process, DNS process integrity is not affected.

Step 7: The UE selects an IP address with a highest priority or that ranks first or a server IP address indicated by the SMF for access and service connection establishment.

It should be noted that the DNS query method provided in the embodiments of this application may be performed by a DNS query apparatus, or a control module that is in the DNS query apparatus and that is configured to perform the DNS query method. In the embodiments of this application, an example in which the DNS query apparatus performs the DNS query method is used as to describe the DNS query apparatus provided in the embodiments of this application.

Figure 15:
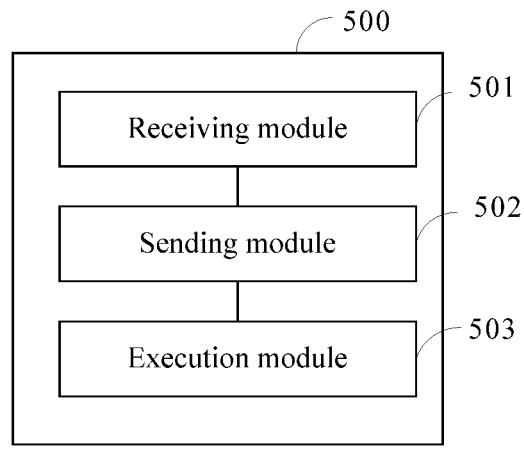
FIG. 15 is a first schematic structural diagram of a DNS query apparatus according to an embodiment of this application.

An embodiment of this application provides a DNS query apparatus. As shown in FIG. 15, the apparatus 500 includes: a receiving module 501, a sending module 502, and an execution module 503.

The receiving module 501 is configured to receive a DNS query to obtain an FQDN. The sending module 502 is configured to send first information to a second communication device, where the first information includes the FQDN or N server IP addresses corresponding to the FQDN, and N is a positive integer. The execution module 503 is configured to obtain N pieces of server experience information from the second communication device, where one piece of server experience information corresponds to one server IP address of the FQDN, and each piece of server experience information is used to indicate service experience of a server corresponding to a respective corresponding server IP address. The sending module 502 is further configured to send a DNS response to a terminal based on the server experience information.

Optionally, the DNS response includes at least one of the following:
the server experience information;
order information corresponding to the N server IP addresses corresponding to the FQDN; or
a target server IP address, where
the order information is used to represent the optimal or sub-optimal degrees of service experience of a server corresponding to each of the server IP addresses; and the target server IP address is determined based on the server experience information, and the target server IP address is at least one of the N server IP addresses.

Optionally, the execution module 503 is further configured to: in a case that the first information includes the N server IP addresses, perform DNS resolution according to the FQDN to obtain the N server IP addresses that match the FQDN.

Optionally, the first information includes the FQDN; and the execution module 503 is further configured to obtain the N server IP addresses from the second communication device, where the N server IP addresses are obtained by the second communication device by performing a database query according to the FQDN.

Optionally, the server experience information is obtained by the second communication device by performing a database query according to the first information.

Optionally, the sending module is configured to sort the N server IP addresses corresponding to the FQDN based on the server experience information, and sending the DNS response to the terminal, where the DNS response includes order information corresponding to the N server IP addresses.

Optionally, the order information corresponding to the N server IP addresses includes:
an order list corresponding to the N server IP addresses;
priority information corresponding to the N server IP addresses; and
the sorted N server IP addresses.

Optionally, the server experience information includes at least one of the following:

response delay information, uplink/downlink transmission rate information, an uplink/downlink bandwidth, a packet loss rate, or a maximum rate.

In the DNS query apparatus provided in this embodiment of this application, an FQDN is obtained after a DNS query is received, and then first information (that is, the FQDN or N server addresses corresponding to the FQDN) is sent to a second communication device, so that the second communication device performs a query based on the first information to obtain server experience information corresponding to the N server addresses, and then sends the server experience information corresponding to the N server IP addresses to the apparatus. The server experience information is used to indicate service experience of a server corresponding to each server IP address in the foregoing N server IP addresses, so that the apparatus can optimize a DNS response based on the optimal or sub-optimal degrees of service experience of the server corresponding to each server IP address, and a terminal can select an optimal IP address to initiate a service connection each time, thereby improving system communication efficiency.

Figure 16:
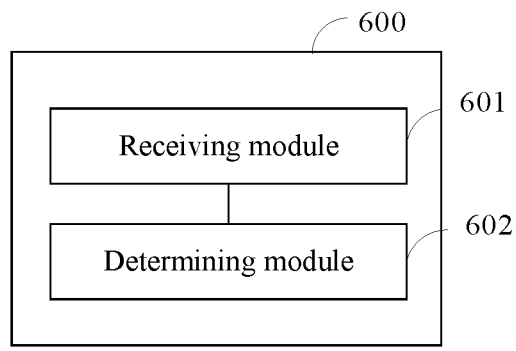
FIG. 16 is a second schematic structural diagram of a DNS query apparatus according to an embodiment of this application.

An embodiment of this application provides a DNS query apparatus. As shown in FIG. 16, the apparatus 600 includes a receiving module 601 and a determining module 602.

The receiving module 601 is configured to receive a DNS response from a first communication device, where the DNS response includes N server IP addresses. The determining module 602 is configured to determine a target server IP address based on the DNS response, where the target server IP address is related to server experience information corresponding to the N server IP addresses; the server experience information is used to indicate service experience of a server corresponding to each of the server IP addresses; the target server IP address is at least one of the N server IP addresses; and N is a positive integer.

Optionally, the DNS response further includes at least one of the following:
the server experience information;
order information corresponding to the N server IP addresses; or
the target server IP address, where
the order information is used to represent the optimal or sub-optimal degrees of service experience of a server corresponding to each of the server IP addresses.

Figure 17:
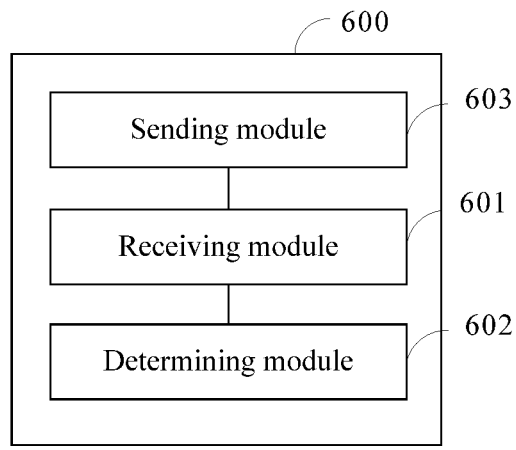
FIG. 17 is a third schematic structural diagram of a DNS query apparatus according to an embodiment of this application.

Optionally, as shown in FIG. 17, the apparatus 600 further includes: a sending module 603, configured to send the N server IP addresses to a second communication device. The receiving module 601 is further configured to receive N pieces of server experience information sent by the second communication device The determining module 602 is configured to determine the target server IP address from the N server IP addresses based on the N pieces of server experience information.

Optionally, the sending module 603 is configured to send the N server IP addresses to the second communication device through a third communication device.

Optionally, the sending module 603 is configured to send the N server IP addresses to the second communication device through a third communication device. The receiving module 601 is configured to receive DNS information sent by the third communication device. The determining module 602 is configured to determine the target server IP address based on the DNS information, where the DNS information is determined by the third communication device based on the server experience information that is corresponding to the N server IP addresses and that is fed back by the second communication device.

Optionally, the DNS information includes at least one of the following:
  the server experience information;
  order information corresponding to the N server IP addresses; or
  the target server IP address, where
  the order information is used to represent the optimal or sub-optimal degrees of service experience of a server corresponding to each of the server IP addresses.

Optionally, the order information corresponding to the N server IP addresses includes:
  an order list corresponding to the N server IP addresses;
  priority information corresponding to each server IP address; and
  the sorted N server IP addresses.

Optionally, the server experience information includes at least one of the following:
  response delay information, uplink/downlink transmission rate information, an uplink/downlink bandwidth, a packet loss rate, or a maximum rate.

In the DNS query apparatus provided in this embodiment of this application, after a DNS response is received, a target server IP address may be determined, based on the DNS response, from N server IP addresses included in the DNS response. The target server IP address is related to server experience information corresponding to the N server addresses, and the N pieces of server experience information are used to indicate service experience of a server corresponding to each server IP address in the foregoing N server IP addresses. In this way, the apparatus can optimize a DNS response based on the optimal or sub-optimal degrees of service experience of the server corresponding to each server IP address, and the terminal can select an optimal IP address to initiate a service connection each time, thereby improving system communication efficiency.

Figure 18:
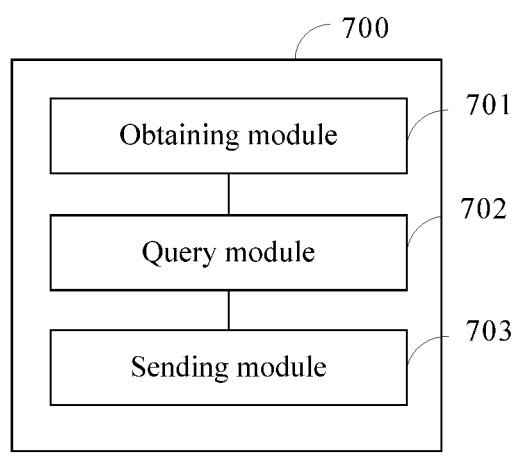
FIG. 18 is a fourth schematic structural diagram of a DNS query apparatus according to an embodiment of this application.

An embodiment of this application provides a DNS query apparatus. As shown in FIG. 18, the apparatus 700 includes an obtaining module 701, a query module 702, and a sending module 703.

The obtaining module 701 is configured to obtain N server IP addresses. The query module 702 is configured to perform a database query based on the N server IP addresses to obtain server experience information of the N server IP addresses, where N is a positive integer. The sending module 703 is configured to send the server experience information to a target device, where the target device includes any one of the following: a terminal, a first communication device, and a third communication device, and the server experience information is used to indicate service experience of a server corresponding to each of the server IP addresses.

Optionally, the obtaining module 701 is configured to: in a case that the target device is the first communication device, receive an FQDN from the first communication device; and perform a database query according to the FQDN to obtain the N server IP addresses that match the FQDN.

Optionally, the sending module 703 is configured to send the N server IP addresses to the first communication device.

Optionally, the obtaining module 701 is configured to receive the N server IP addresses from the target device.

Optionally, the server experience information includes at least one of the following:
  response delay information, uplink/downlink transmission rate information, an uplink/downlink bandwidth, a packet loss rate, or a maximum rate.

In the DNS query apparatus provided in this embodiment of this application, after N server IP addresses corresponding to an FQDN are obtained, server experience information corresponding to the N server IP addresses may be obtained through a query, and then the server experience information corresponding to the N server IP addresses is sent to a first communication device or a terminal. The server experience information is used to indicate service experience of a server corresponding to each server IP address in the foregoing N server IP addresses, so that the first communication device or the terminal can optimize a DNS response based on the optimal or sub-optimal degrees of service experience of the server corresponding to each server IP address, and the terminal can select an optimal IP address to initiate a service connection each time, thereby improving system communication efficiency.

The DNS query apparatus in this embodiment of this application may be an apparatus, an apparatus or an electronic device with an operating system, or a component, an integrated circuit, or a chip in a terminal. The apparatus or the electronic device may be a mobile terminal or a non-mobile terminal. For example, the mobile terminal may include but is not limited to the foregoing listed types of the terminal 11. The non-mobile terminal may be a server, a network attached storage (NAS), a personal computer (PC), a television (TV), a teller machine, or a self-service machine. This is not limited in this embodiment of this application.

The DNS query apparatus provided in this embodiment of this application can implement the processes implemented in the method embodiments of FIG. 2 to FIG. 14, and achieve a same technical effect. To avoid repetition, details are not described herein again.

Figure 19:
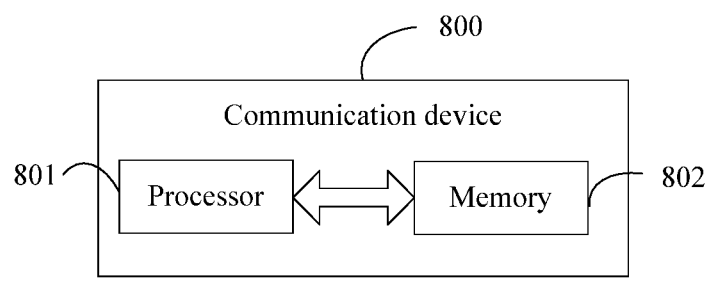
FIG. 19 is a schematic structural diagram of a communication device according to an embodiment of this application.

Optionally, as shown in FIG. 19, an embodiment of this application further provides a communication device 800, including a processor 801, a memory 802, a program or an instruction stored in the memory 802 and executable on the processor 801. For example, when the communication device 800 is a terminal and the program or the instruction is executed by the processor 801, the processes that can be performed by the terminal in the foregoing method embodiment of the DNS query method are implemented, and a same technical effect can be achieved. When the communication device 800 is a communication device and the program or the instruction is executed by the processor 801, the processes that can be performed by the first communication device, the second communication device, and the third communication device in the foregoing method embodiment of the DNS query method are implemented, and a same technical effect can be achieved. To avoid repetition, details are not described herein again.

Figure 20:
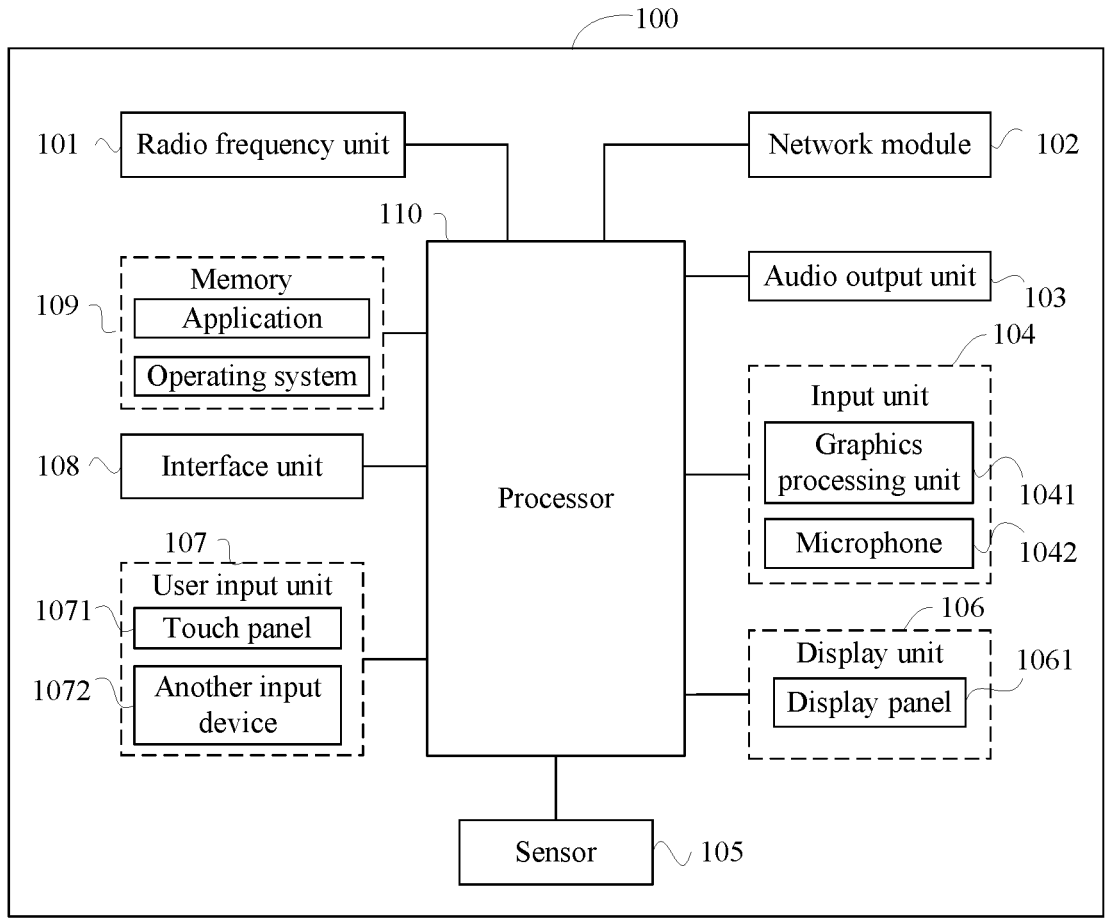
FIG. 20 is a schematic structural diagram of a terminal according to an embodiment of this application.

An embodiment of this application further provides a terminal, including a processor and a communication interface. The communication interface is configured to receive a DNS response from a first communication device, where the DNS response includes N server IP addresses. The processor is configured to determine a target server IP address based on the DNS response, where the target server IP address is related to server experience information corresponding to the N server IP addresses; the server experience information is used to indicate service experience of a server corresponding to each of the server IP addresses; the target server IP address is at least one of the N server IP addresses; and N is a positive integer. This terminal embodiment corresponds to the foregoing method embodiment on the terminal side. Each implementation process and implementation of the foregoing method embodiment may be applicable to this terminal embodiment, and a same technical effect can be achieved. For example, FIG. 20 is a schematic diagram of a hardware structure of a terminal according to an embodiment of this application.

The terminal 100 includes but is not limited to at least a part of components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the terminal 100 may further include the power supply (for example, a battery) that supplies power to each component. The power supply may be logically connected to the processor 110 by using a power supply management system, so as to manage functions such as charging, discharging, and power consumption by using the power supply management system. The terminal structure shown in FIG. 20 constitutes no limitation on the terminal, and the terminal may include more or fewer components than those shown in the figure, or combine some components, or have different component arrangements. Details are not described herein.

It should be understood that, in this embodiment of this application, the input unit 104 may include a graphics processing unit (GPU) 1041 and a microphone 1042, and the graphics processing unit 1041 processes image data of a still image or a video that is obtained by an image capturing apparatus (for example, a camera) in a video capturing mode or an image capturing mode. The display unit 106 may include a display panel 1061. The display panel 1061 may be configured in a form such as a liquid crystal display or an organic light-emitting diode. The user input unit 107 may include a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein.

In this embodiment of this application, the radio frequency unit 101 receives downlink data from a network side device and then sends the downlink data to the processor 110 for processing; and sends uplink data to the network side device. Usually, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a program or instruction storage area and a data storage area. The program or instruction storage area may store an operating system, and an application or an instruction required by at least one function (for example, a sound playing function or an image playing function). In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 110 may include one or more processing units. Optionally, an application processor and a modem processor may be integrated into the processor 110. The application processor mainly processes an operating system, a user interface, an application, an instruction, or the like. The modem processor mainly processes wireless communication, for example, a baseband processor. It can be understood that, alternatively, the modem processor may not be integrated into the processor 110.

The radio frequency unit 101 is configured to receive a DNS response from a first communication device, where the DNS response includes N server IP addresses. The processor 110 is configured to determine a target server IP address based on the DNS response, where the target server IP address is related to server experience information corresponding to the N server IP addresses; the server experience information is used to indicate service experience of a server corresponding to each of the server IP addresses; the target server IP address is at least one of the N server IP addresses; and N is a positive integer.

Optionally, the DNS response further includes at least one of the following:
 the server experience information;
 order information corresponding to the N server IP addresses; or
 the target server IP address, where
 the order information is used to represent the optimal or sub-optimal degrees of service experience of a server corresponding to each of the server IP addresses.

Optionally, the radio frequency unit 101 is configured to send the N server IP addresses to a second communication device. The radio frequency unit 101 is further configured to receive N pieces of server experience information sent by the second communication device. The processor 110 is configured to determine the target server IP address from the N server IP addresses based on the N pieces of server experience information.

Optionally, the radio frequency unit 101 is configured to send the N server IP addresses to the second communication device through a third communication device.

Optionally, the radio frequency unit 101 is configured to send the N server IP addresses to the second communication device through a third communication device. The radio frequency unit 101 is configured to receive DNS information sent by the third communication device. The processor 110 is configured to determine the target server IP address based on the DNS information, where the DNS information is determined by the third communication device based on the server experience information that is corresponding to the N server IP addresses and that is fed back by the second communication device.

Optionally, the DNS information includes at least one of the following:
 the server experience information;
 order information corresponding to the N server IP addresses; or
 the target server IP address, where
 the order information is used to represent the optimal or sub-optimal degrees of service experience of a server corresponding to each of the server IP addresses.

Optionally, the order information corresponding to the N server IP addresses includes:
 an order list corresponding to the N server IP addresses;
 priority information corresponding to each server IP address; and
 the sorted N server IP addresses.

Optionally, the server experience information includes at least one of the following:
 response delay information, uplink/downlink transmission rate information, an uplink/downlink bandwidth, a packet loss rate, or a maximum rate.

In the terminal provided in this embodiment of this application, after receiving a DNS response, the terminal may determine, based on the DNS response, a target server IP address from N server IP addresses included in the DNS response. The target server IP address is related to server experience information corresponding to the N server addresses, and the N pieces of server experience information are used to indicate service experience of a server corresponding to each server IP address in the foregoing N server IP addresses. In this way, the terminal can optimize a DNS response based on the optimal or sub-optimal degrees of service experience of the server corresponding to each server IP address, and the terminal can select an optimal IP address to initiate a service connection each time, thereby improving system communication efficiency.

An embodiment of this application further provides a network side device, including a processor and a communication interface.

The communication interface is configured to receive a DNS query to obtain an FQDN. The communication interface is further configured to send first information to a second communication device, where the first information includes the FQDN or N server IP addresses corresponding to the FQDN, and N is a positive integer. The processor is configured to obtain N pieces of server experience information from the second communication device, where one piece of server experience information corresponds to one server IP address of the FQDN, and each piece of server experience information is used to indicate service experience of a server corresponding to a respective corresponding server IP address. The communication interface is further configured to send a DNS response to a terminal based on the server experience information.

The processor is configured to obtain N server IP addresses. The processor is further configured to perform a database query based on the N server IP addresses to obtain server experience information of the N server IP addresses, where N is a positive integer. The communication interface is configured to send the server experience information to a target device, where the target device includes any one of the following: a terminal, a first communication device, and a third communication device, and the server experience information is used to indicate service experience of a server corresponding to each of the server IP addresses.

This network side device embodiment corresponds to the foregoing method embodiment corresponding to the first communication device or the second communication device. Each implementation process and implementation of the foregoing method embodiment may be applicable to this embodiment corresponding to the first communication device or the second communication device, and a same technical effect can be achieved.

Figure 21:
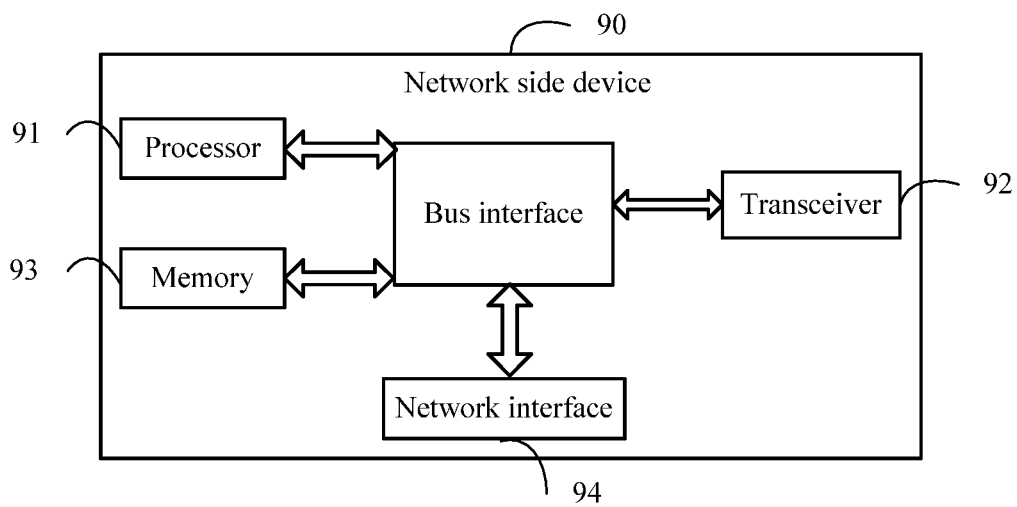
FIG. 21 is a schematic structural diagram of a network side device according to an embodiment of this application.

For example, an embodiment of this application further provides a network side device. As shown in FIG. 21, the network side device 90 in this embodiment of the present application includes a processor 91, a transceiver 92, a memory 93, a network interface 94, and a bus interface. In FIG. 21, a bus architecture may include any quantity of interconnected buses and bridges. For example, various circuits of one or more processors represented by the processor 91 and a memory represented by the memory 93 are interconnected. The bus architecture may further link various other circuits such as a peripheral device, a voltage regulator, and a power management circuit. These are well known in the art, and therefore are not described in this specification. A bus interface provides an interface. The transceiver 92 may be a plurality of components. To be specific, the transceiver 92 includes a transmitter and a receiver, and provides a unit configured to communicate with various other apparatuses on a transmission medium. The processor 91 is responsible for bus architecture management and general processing. The memory 93 may store data used by the processor 91 when the processor 91 performs an operation. In addition, the network side device further includes some function modules that are not shown. Details are not described herein.

For example, the network side device further includes an instruction or a program stored in the memory 93 and executable on the processor 91. The processor 91 invokes the instruction or the program in the memory 93 to perform the method performed by the modules shown in the figure, and a same technical effect is achieved. To avoid repetition, details are not described herein again.

An embodiment of this application further provides a non-transitory readable storage medium. The non-transitory readable storage medium stores a program or an instruction, and when the program or the instruction is executed by a processor, the processes of the method embodiment of the foregoing DNS query method are implemented, and a same technical effect can be achieved. To avoid repetition, details are not described herein again.

The processor is a processor in the terminal in the foregoing embodiment. The non-transitory readable storage medium includes a non-transitory computer readable storage medium, for example, a read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the method embodiment of the foregoing DNS query method, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the foregoing descriptions of the embodiments, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are merely illustrative but not restrictive. Under the enlightenment of this application, a person of ordinary skill in the art can make many forms without departing from the purpose of this application and the protection scope of the claims, all of which fall within the protection of this application.

What is claimed is:

1. A domain name server (DNS) query method, wherein the method comprises:
    receiving, by a first communication device, a DNS query to obtain a fully qualified domain name (FQDN);
    sending, by the first communication device, first information to a second communication device, wherein the first information comprises the FQDN or N server Internet protocol (IP) addresses corresponding to the FQDN, and N is a positive integer;
    obtaining, by the first communication device, N pieces of server experience information from the second communication device, wherein one piece of server experience information corresponds to one server IP address of the FQDN, and each piece of server experience information is used to indicate service experience of a server corresponding to a respective corresponding server IP address; and
    sending, by the first communication device, a DNS response to a terminal based on the server experience information.

2. The method according to claim 1, wherein the DNS response comprises at least one of the following:
    the server experience information;
    order information corresponding to the N server IP addresses corresponding to the FQDN; or
    a target server IP address, wherein
    the order information is used to represent optimal or sub-optimal degrees of service experience of a server corresponding to each of the server IP addresses; and the target server IP address is determined based on the server experience information, and the target server IP address is at least one of the N server IP addresses.

3. The method according to claim 2, wherein the order information corresponding to the N server IP addresses comprises:
    an ordering list corresponding to the N server IP addresses;
    priority information corresponding to the N server IP addresses; and
    sorted N server IP addresses.

4. The method according to claim 1, wherein in a case that the first information comprises the N server IP addresses, before the sending, by the first communication device, first information to a second communication device, the method further comprises:
    performing, by the first communication device, DNS resolution according to the FQDN to obtain the N server IP addresses that match the FQDN.

5. The method according to claim 1, wherein the first information comprises the FQDN; and
    after the sending, by the first communication device, first information to a second communication device, the method further comprises:
    obtaining, by the first communication device, the N server IP addresses from the second communication device, wherein
    the N server IP addresses are obtained by the second communication device by performing a database query according to the FQDN.

6. The method according to claim 1, wherein the server experience information is obtained by the second communication device by performing a database query according to the first information.

7. The method according to claim 1, wherein the sending, by the first communication device, a DNS response to a terminal based on the server experience information comprises:
    performing, by the first communication device, ordering on the N server IP addresses corresponding to the FQDN based on the server experience information, and sending the DNS response to the terminal, wherein the DNS response comprises order information corresponding to the N server IP addresses.

8. The method according to claim 1, wherein the server experience information comprises at least one of the following:
    a response delay, an uplink/downlink transmission rate, an uplink/downlink bandwidth, a packet loss rate, or a maximum rate.

9. A communication device, comprising a processor, a memory, and a program or an instruction stored in the memory and executable on the processor, wherein when the program or the instruction is executed by the processor, steps of the DNS query method according to claim 1 are implemented.

10. A domain name server (DNS) query method, wherein the method comprises:
    receiving, by a terminal, a DNS response from a first communication device, wherein the DNS response comprises N server Internet protocol (IP) addresses; and
    determining, by the terminal, a target server IP address based on the DNS response, wherein the target server IP address is related to server experience information corresponding to the N server IP addresses; the server experience information is used to indicate service experience of a server corresponding to each of the server IP addresses; the target server IP address is at least one of the N server IP addresses; and N is a positive integer.

11. The method according to claim 10, wherein the determining, by the terminal, a target server IP address based on the DNS response comprises:
    sending, by the terminal, the N server IP addresses to a second communication device;
    receiving, by the terminal, N pieces of server experience information sent by the second communication device; and
    determining, by the terminal, the target server IP address from the N server IP addresses based on the N pieces of server experience information.

12. The method according to claim 11, wherein the sending, by the terminal, the N server IP addresses to a second communication device comprises:

sending, by the terminal, the N server IP addresses to the second communication device through a third communication device.

13. The method according to claim 10, wherein the DNS response further comprises at least one of the following:
the server experience information;
order information corresponding to the N server IP addresses; or
the target server IP address, wherein
the order information is used to represent optimal or sub-optimal degrees of service experience of a server corresponding to each of the server IP addresses.

14. The method according to claim 10, wherein the determining, by the terminal, a target server IP address based on the DNS response comprises:
sending, by the terminal, the N server IP addresses to the second communication device through a third communication device;
receiving, by the terminal, DNS information sent by the third communication device; and
determining, by the terminal, the target server IP address based on the DNS information, wherein
the DNS information is determined by the third communication device based on the server experience information that is corresponding to the N server IP addresses and that is fed back by the second communication device.

15. A terminal, comprising a processor, a memory, and a program or an instruction stored in the memory and executable on the processor, wherein when the program or the instruction is executed by the processor, steps of the DNS query method according to claim 6 are implemented.

16. A domain name server (DNS) query method, wherein the method comprises:
obtaining, by a second communication device, N server Internet protocol (IP) addresses;
performing, by the second communication device, a database query based on the N server IP addresses to obtain server experience information of the N server IP addresses, wherein N is a positive integer; and
sending, by the second communication device, the server experience information to a target device, wherein
the target device comprises any one of the following: a terminal, a first communication device, and a third communication device, and the server experience information is used to indicate service experience of a server corresponding to each of the server IP addresses.

17. The method according to claim 16, wherein the obtaining, by a second communication device, N server IP addresses comprises:
in a case that the target device is the first communication device, receiving, by the second communication device, a fully qualified domain name (FQDN) from the first communication device; and
performing, by the second communication device, a database query according to the FQDN to obtain the N server IP addresses that match the FQDN.

18. The method according to claim 17, wherein after the performing, by the second communication device, a database query according to the FQDN to obtain the N server IP addresses that match the FQDN, the method further comprises:
sending, by the second communication device, the N server IP addresses to the first communication device.

19. The method according to claim 16, wherein the obtaining, by a second communication device, N server IP addresses comprises:
receiving, by the second communication device, the N server IP addresses from the target device.

20. A communication device, comprising a processor, a memory, and a program or an instruction stored in the memory and executable on the processor, wherein when the program or the instruction is executed by the processor, steps of the DNS query method according to claim 16 are implemented.

* * * * *